(12) United States Patent
Ochiai et al.

(10) Patent No.: US 7,944,529 B2
(45) Date of Patent: May 17, 2011

(54) TRANSFLECTIVE LIQUID CRYSTAL DISPLAY DEVICE

(75) Inventors: Takahiro Ochiai, Chiba (JP); Toshio Miyazawa, Chiba (JP); Masahiro Maki, Mobara (JP); Tohru Sasaki, Mobara (JP); Masateru Morimoto, Mobara (JP)

(73) Assignee: Hitachi Displays, Ltd., Chiba-ken (JP)

( * ) Notice: Subject to any disclaimer, the term of this patent is extended or adjusted under 35 U.S.C. 154(b) by 0 days.

(21) Appl. No.: 12/923,782

(22) Filed: Oct. 7, 2010

(65) Prior Publication Data

US 2011/0025961 A1 Feb. 3, 2011

Related U.S. Application Data

(63) Continuation of application No. 11/819,907, filed on Jun. 29, 2007, now Pat. No. 7,834,964.

(30) Foreign Application Priority Data

Jul. 14, 2006 (JP) ................................. 2006-193485

(51) Int. Cl.
*G02F 1/1335* (2006.01)
(52) U.S. Cl. ........ 349/114; 349/123; 349/124; 349/125; 349/127; 349/128; 349/129; 349/130; 349/141
(58) Field of Classification Search .................. 349/114, 349/123, 124, 125, 126, 128, 127, 129, 130, 349/141, 113, 143, 110, 42, 43, 41, 139, 349/144
See application file for complete search history.

(56) References Cited

U.S. PATENT DOCUMENTS

| | | | |
|---|---|---|---|
| 6,900,853 B2 | 5/2005 | Watanabe et al. ................ 349/43 |
| 6,914,656 B2 | 7/2005 | Sakamoto et al. ............. 349/141 |
| 7,362,400 B2 | 4/2008 | Itou et al. ....................... 349/141 |
| 7,369,194 B2 | 5/2008 | Yang .............................. 349/106 |
| 7,486,365 B2 | 2/2009 | Yamazaki et al. ............. 349/143 |
| 7,502,084 B2 | 3/2009 | Nishimura ..................... 349/114 |
| 7,567,327 B2 | 7/2009 | Kawachi et al. ............... 349/141 |
| 7,710,388 B2 * | 5/2010 | Hirata et al. ................... 345/103 |
| 7,834,964 B2 * | 11/2010 | Ochiai et al. .................. 349/114 |
| 2002/0021396 A1 | 2/2002 | Yoo et al. ....................... 349/141 |
| 2005/0168423 A1* | 8/2005 | Hirata et al. .................... 345/88 |
| 2007/0002226 A1 | 1/2007 | Sakamoto et al. ............. 349/114 |
| 2007/0103626 A1 | 5/2007 | Morimoto et al. ............. 349/114 |
| 2011/0025961 A1* | 2/2011 | Ochiai et al. .................. 349/114 |

FOREIGN PATENT DOCUMENTS

| | | |
|---|---|---|
| JP | 2003-344837 | 12/2003 |
| JP | 2007-41572 | 2/2007 |
| JP | 2007-127933 | 5/2007 |

* cited by examiner

*Primary Examiner* — Brian M Healy
(74) *Attorney, Agent, or Firm* — Stites & Harbison PLLC; Juan Carlos A. Marquez, Esq.

(57) ABSTRACT

A transflective liquid crystal display device with improved display quality in which the liquid initial alignment direction of the liquid crystal layer is in a direction perpendicular to the extending direction of a clearance between the counter electrode of a transmission portion and a counter electrode of a reflection portion or in a direction within a range of ±2° in the clockwise direction perpendicular to the extending direction of the clearance in a case where the liquid crystal layer comprises positive type liquid crystals, or the liquid crystal initial alignment direction of the liquid crystal layer is in a direction parallel with the extending direction of a clearance, or a direction within a range of ±2° in the clockwise direction relative to the extending direction of the clearance in a case where the liquid crystal layer comprises negative type liquid crystals.

4 Claims, 23 Drawing Sheets

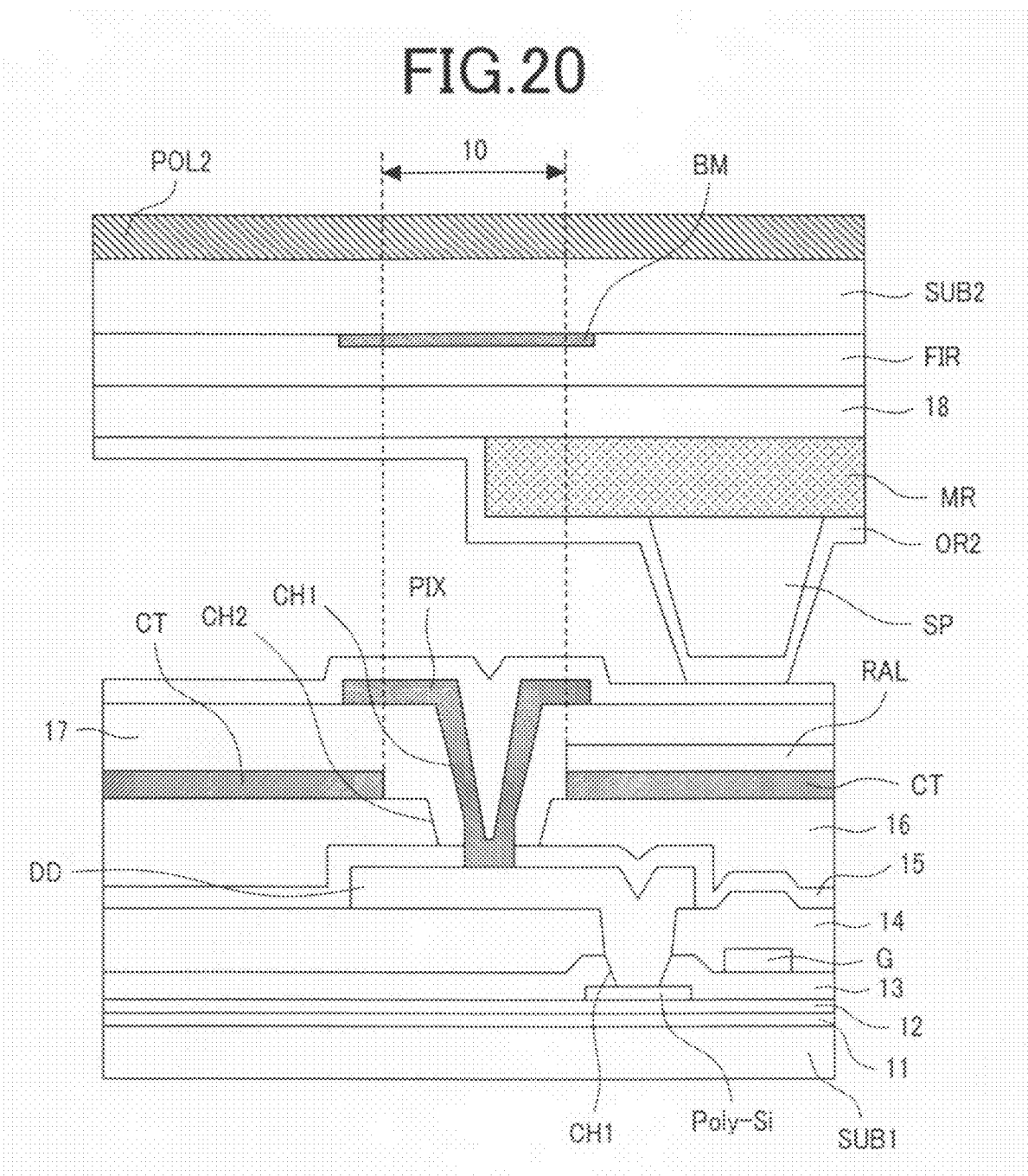

TRANSFLECTIVE LIQUID CRYSTAL DISPLAY DEVICE

CROSS-REFERENCE TO RELATED APPLICATION

This application is a Continuation of U.S. patent application Ser. No. 11/819,907 filed Jun. 29, 2007 now U.S. Pat. No. 7,834,964. The present application claims priority from U.S. patent application Ser. No. 11/819,907 filed Jun. 29, 2007, which claims priority from Japanese Application JP 2006-193485 filed on Jul. 14, 2006, the content of which is hereby incorporated by reference into this application.

BACKGROUND OF THE INVENTION (1) Field of the Invention

The present invention concerns a transflective liquid crystal display device and, more specifically, it relates to a technique which is effective to the application for IPS system transflective liquid crystal display devices.

(2) Description for the Related Art

A transflective liquid crystal display device having a transmission portion and a reflection portion in a 1 sub-pixel has been used as a display for use in portable equipments.

For the transflective liquid crystal display device, a vertical electric field. system for driving liquid crystals by applying an electric field to liquid crystals put between a pair of substrates in a direction vertical to the substrate plane of the pair of substrates has been used. Further, for mating characteristics between the transmission portion and the reflection portion, a step is formed between the transmission portion and the reflection portion and, further, a phase difference plate is disposed between the polarization plate and a liquid crystal layer.

As the liquid crystal display device, an IPS system liquid crystal display device has been known and, in the IPS system liquid crystal display device, a pixel electrode (PIX) and a counter electrode (CT) are formed on one identical substrate and an electric field is applied therebetween to rotate liquid crystals in a substrate plane thereby conducting bright/dark control. Accordingly, it has a feature that the contrast density of displayed images is not reversed upon observing a screen from an oblique direction. For taking advantage of the feature, it has been proposed to constitute a transflective liquid crystal display device by using the IPS system liquid crystal display device, for example, in Japanese Patent Laid-Open Publication No. 2003-344837.

Usually, the IPS system transparent liquid crystal display device is normally black. Accordingly, in a case of constituting the transflective liquid crystal display device by using the IPS system liquid crystal display device in a case where a phase difference plate is not provided, there is problem that the reflection portion becomes normally white in a case where the transmission portion is a normally black and the bright/dark state is reversed between the transmission portion and the reflection portion as described also in the patent document described above.

For solving the problem described above☐the present applicant has already filed a patent application regarding a transflective liquid crystal display device having a novel pixel structure (refer to Japanese Patent Application No. 2005-322049).

In the transflective liquid crystal display device of the former patent application, as a pixel structure for each of sub-pixels, counter electrodes are made independent between the transmission portion and the reflection portion respec- tively relative to a pixel electrode which is in common with the transparent portion and the reflection portion and different reference voltages (counter voltage or common voltage) are applied respectively thereby preventing reversal of bright/dark state between the transmission portion and the reflection portion.

Further, in the transflective liquid crystal display device already filed, the transmission portion has a normally black characteristic (black display in a state of not applying voltage) and the reflection portion has a normally white characteristic (white display in a state of not applying the voltage).

SUMMARY OF THE INVENTION

As described above, in the transflective liquid crystal display device in the former patent application, the counter electrodes are made independent between the transmission portion and the reflection portion respectively to the pixel electrode in common with the transmission portion and the reflection portion and reference voltages (counter voltage or common voltage) different from each other are applied to prevent reversal of the bright/dark state between the transmission portion and the reflection portion.

However, in a case of dividing the counter electrode into the transmission portion and the reflection portion in a 1 sub-pixel, since the voltages applied are different from each other, an electric field is generated normally between the counter electrode of the transmission portion and the counter electrode of the reflection portion at a clearance (or gap) between the opposed counter electrodes. Upon black display in the transmission portion, an electric field is not generated between the pixel electrode and the counter electrode of the transmission portion and it is supposed that when the electric field between the counter electrode of the transmission portion and the counter electrode of the reflection portion should leak to the transmission portion, liquid crystals are rotated to form a light leakage portion to result in the degradation of display quality.

The present invention has been accomplished for solving the problem in the prior art and the invention intends to provide a technique capable of improving the display quality in a transflective liquid crystal display device.

The foregoing and other objects and novel features of the invention will become apparent by the descriptions of the specification and the accompanying drawings.

Outline of typical inventions among those disclosed in the present application are as follows.

(1) A transflective liquid crystal display device including a liquid crystal display panel having a pair of substrates and a liquid crystal layer put between the pair of substrates, in which the liquid crystal display panel has a plurality of sub-pixels each having a transmission portion and a reflection portion, and each of the plurality of sub-pixels has a pixel electrode and a counter electrode, wherein in each of the sub-pixels, the pixel electrode is in common with the transmission portion and the reflection portion, the counter electrode is independent between the transmission portion and the reflection portion, the potential applied to the counter electrode is different between the transmission portion and the reflection portion, and the liquid crystal layer comprises positive type liquid crystals, and the liquid crystal initial alignment direction of the liquid crystal layer is in a direction perpendicular to the extending direction of a clearance between the counter electrode of the transmission portion and the counter electrode of the reflection portion, or in a direction within a range of ±2° in a clockwise direction relative to the direction perpendicular to the extending direction of the clearance.

(2) A transflective liquid crystal display device including a liquid crystal display panel having a pair of substrates and a liquid crystal layer put between the pair of substrates, in which the liquid crystal display panel has a plurality of sub-pixels each having a transmission portion and a reflection portion, and each of the plurality of sub-pixels has a pixel electrode and a counter electrode, wherein in each of the sub-pixels, the pixel electrode is in common with the transmission portion and the reflection portion, the counter electrode is independent between the transmission portion and the reflection portion, the potential applied to the counter electrode is different between the transmission portion and the reflection portion, the liquid crystal layer comprises negative type liquid crystals, and the liquid crystal initial alignment direction of the liquid crystal layer is in a direction parallel to the extending direction of a clearance between the counter electrode of the transmission portion and the counter electrode of the reflection portion, or in a direction within a range of ±2° in a clockwise direction relative to the extending direction of the clearance.

(3) A transflective liquid crystal display device according to (1) or (2) above, wherein the counter electrode and the pixel electrode are formed on one of the pair of substrates, the transmission portion has a normally black characteristic providing black display in a state of not applying a voltage, and the reflection portion has a normally white characteristic providing white display in a state of not applying a voltage.

(4) A transflective liquid crystal display device according to (3) above, wherein the counter electrode is a planar electrode, the pixel electrode is an electrode having a plurality of linear portions and formed to one of the substrates to a layer above the counter electrode, and the extending direction of the clearance and the extending direction of the linear portion of the pixel electrode intersect obliquely.

(5) A transflective liquid crystal display device according to (3) above, wherein the pixel electrode is a planar electrode, the counter electrode is an electrode having a plurality of linear portions and formed to one of the substrate to a layer above the pixel electrode, and the extending direction of the clearance and the extending direction of the linear portion of the counter electrode intersect obliquely.

(6) A transflective liquid crystal display device according to (5) above, wherein the plurality of linear portions of the counter electrode have a connection portion on the side of the clearance.

(7) A transflective liquid crystal display device according any one of (3) to (6) above, wherein a narrow angle of angles formed between the direction of applying an electric field to the transmission portion and the liquid crystal initial alignment direction of the liquid crystal layer is different from a narrow angle of angles formed between the direction of applying an electric field to the reflection portion and the liquid crystal initial alignment direction of the liquid crystal layer.

(8) A transflective liquid crystal display device according any one of (1) to (7) above, wherein a first polarization plate is disposed on one substrate of the pair of substrates and a second polarization plate is disposed on the other substrate of the pair of substrates respectively, the respective polarization axes of the first and second polarization plates are perpendicular to each other, and the liquid crystal initial alignment axis of the liquid crystal layer and the polarization axis of one of the first polarization plate and the second polarization plate are aligned.

(9) A transflective liquid crystal display device according any one of (1) to (8) above, wherein in each of the sub-pixels, the potential applied to the counter electrode for one of the transmission portion or the reflection portion is a potential higher than the potential applied to the pixel electrode, and the potential applied to the counter electrode for the other of the transmission portion or the reflection portion is a potential lower than the potential applied to the pixel electrode.

(10) A transflective liquid crystal display device according any one of (1) to (9) above, wherein for adjacent two display lines defined as one display line and the other display line, the counter electrode of the reflection portion in each of the sub-pixels of one display line, and the counter electrode of the transmission portion in each of the sub-pixels of the other display line are a common electrode.

(11) A transflective liquid crystal display device including a liquid crystal display panel having a pair of substrates and a liquid crystal layer put between the pair of substrates, in which the liquid crystal display panel has a plurality of sub-pixels each having a transmission portion and a reflection portion, and each of the plurality of sub-pixels has a pixel electrode and a counter electrode, wherein an active element formed below the reflection portion and a video signal line extending while bending in each of the sub-pixels overriding the transmission portion and the reflection portion are provided and, for adjacent two display lines defined as one display line and the other display line, the bending direction and the bending angle of the video signal line in the reflection portion of one display line is identical with the bending direction and the bending angle of the video signal line in the reflection portion of the other display line.

(12) A transflective liquid crystal display device according to (11) above, wherein in each of the sub-pixels, the pixel electrode is in common with the transmission portion and the reflection portion, and the counter electrode is independent between the transmission portion and the reflection portion respectively, the potential applied to the counter electrode is different between the transmission portion and the reflection portion, the counter electrode and the pixel electrode are formed on one of the pair of the substrates, the transmission portion has a normally black characteristic providing black display in a state of not applying voltage, and the reflection portion has a normally white characteristic providing white display in a state of not applying voltage.

(13) A transflective liquid crystal display device including a liquid crystal display panel having a pair of substrates and a liquid crystal layer put between the pair of substrates, in which the liquid crystal display panel has a plurality of sub-pixels each having a transmission portion and a reflection portion, and each of the plurality of sub-pixels has a pixel electrode and a counter electrode, wherein in each of the sub pixels, the pixel electrode is in common with the transmission portion and the reflection portion, and the counter electrodes is independent respectively between the transmission portion and the reflection portion; and at least a central portion along the extending direction of the clearance between the counter electrode of the transmission portion and the counter electrode of the reflection portion is shielded by a light shielding film.

(14) A transflective liquid crystal display device according to (13) above, wherein the potential applied to the counter electrodes is different between the transmission portion and the reflection portion, the counter electrode and the pixel electrode are formed on one of the pair of substrates, the transmission portion has a normally black characteristic providing black display in a state of not applying a voltage, and the reflection portion has a normally white characteristic providing white display in a state of not applying a voltage.

Effects obtained by typical inventions among those disclosed in the present application are to be described briefly as below.

According to the invention, it is possible to improve the display quality in the transflective liquid crystal display device.

BRIEF DESCRIPTION OF THE DRAWINGS

These and other features, objects and advantages of the present invention will become more apparent from the following description when taken in conjunction with the accompanying drawings wherein:

FIG. 6(a) is a cross sectional structure along line D-D' in FIG. 1A; FIG. 6(b) is a cross sectional structure along Line E-E' in FIG. 1A;

FIG. 20 is a cross sectional view for a main portion showing a cross sectional structure along line K-K' in FIG. 19;

DETAILED DESCRIPTION OF THE INVENTION

Figure 1A:
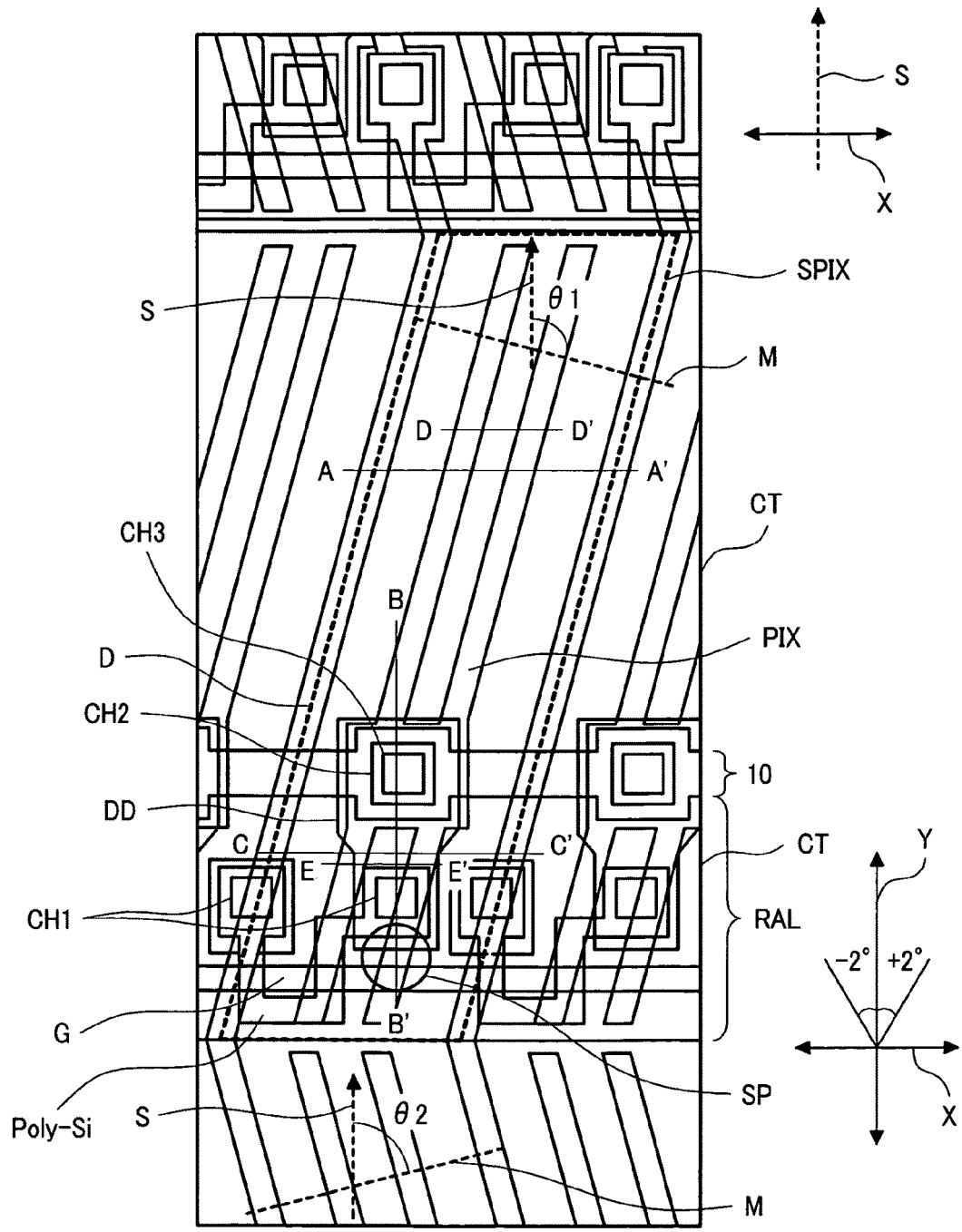
FIG. 1A is a plan view showing an electrode structure of a sub-pixel of a transflective liquid crystal display device as a first embodiment of the invention.

The present invention is to be described specifically by way of preferred embodiments with reference to the drawings.

Throughout the drawings for describing the preferred embodiments, those portions having identical functions carry identical reference numerals for which duplicate descriptions are to be omitted.

[Transflective Liquid Crystal Display Device as a Base of the Invention]

Figure 22:
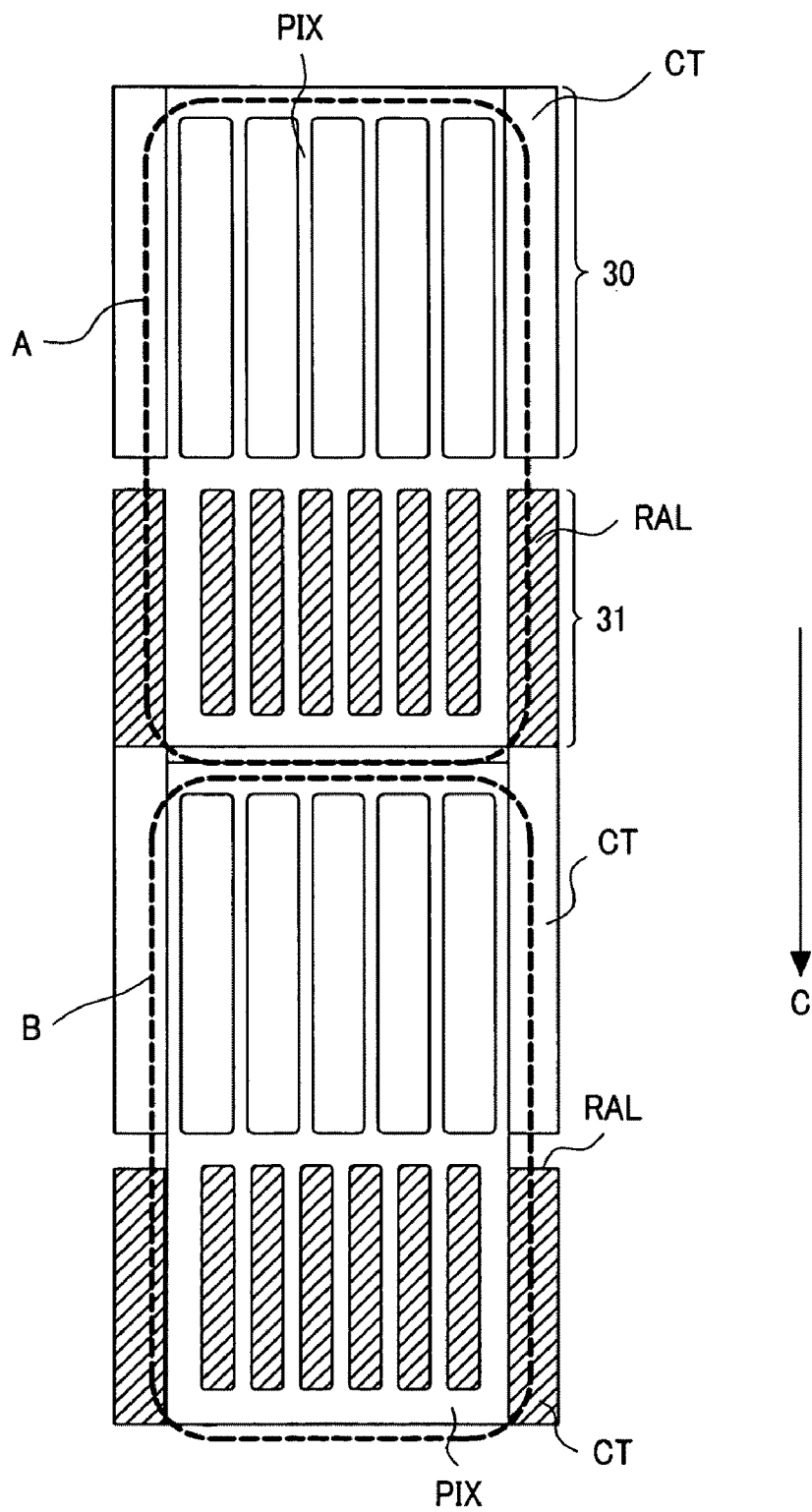
FIG. 22 is a plan view showing an electrode structure for a sub-pixel of a transparent type liquid crystal display device as a base of the invention.
Figure 23:
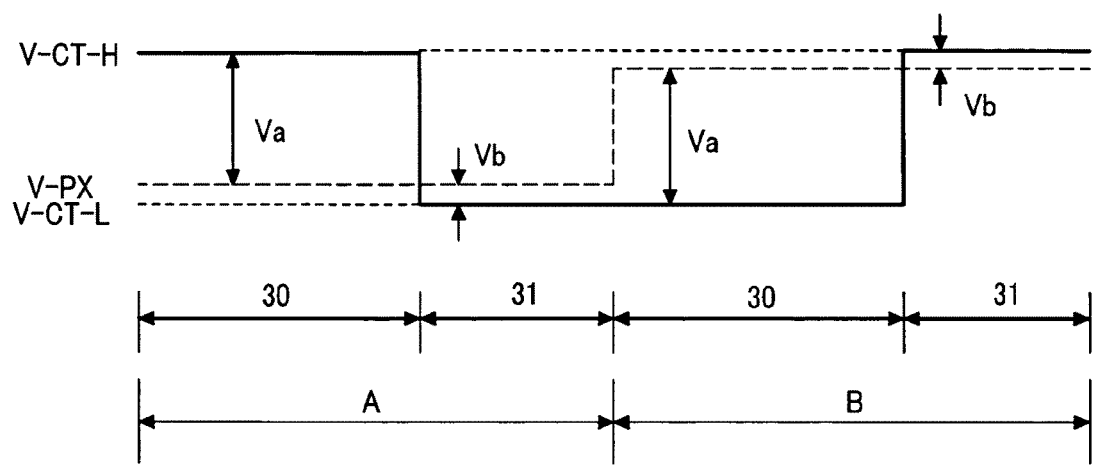
FIG. 23 is a graph showing a reference voltage to be applied to a counter electrode of a transmission portion and a counter electrode of the reflection portion in a transparent type liquid crystal display device as the base of the invention.

FIG. 22 and FIG. 23 are views concerning a transflective liquid crystal display device as a base of the invention in which FIG. 22 is a plan view showing an electrode structure of a sub-pixel and FIG. 23 is a graph showing a reference voltage applied to a counter electrode of a transmission portion and a counter electrode of a reflection portion.

In FIG. 22, 30 denotes a transmission portion constituting a transparent type liquid crystal display panel and 31 denotes a reflection portion constituting a reflection type liquid crystal display panel.

In this case, while the pixel electrode (PIX) is common, but the counter electrodes (CT) are independent between the transmission portion 30 and the reflection portion 31 respectively. That is, the counter electrode (CT) is bisected into the transmission portion and the reflection portion. Then, a reflection electrode (RAL) is formed on the counter electrode (CT) of the reflection portion 31.

FIG. 22 illustrates a case in which a counter electrode (CT) of the reflection portion 31 in one display line (display line having a sub-pixel shown by A in FIG. 22) and a counter electrode (CT) of a transmission portion 30 in the other display line (display line having a sub-pixel shown by B in FIG.

22) of two adjacent display lines are constituted with a common electrode. Further, an arrow C in FIG. 22 shows a scanning direction.

Then, as shown in FIG. 23, different reference voltages are applied to the counter electrode (CT) for the transmission portion. 30 and the counter electrode (CT) for the reflection portion 31.

For example, in a sub-pixel shown by A in FIG. 22, a reference voltage (V-CT-H) at a high level (hereinafter referred to as an H level) is applied to the counter electrode (CT) of the transmission portion 30, and a reference voltage (V-CT-L) at a Low level (hereinafter referred to as an L level) is applied to the counter electrode (CT) of the reflection portion 31.

Further, in a sub-pixel shown by A in FIG. 22, a video voltage (V-PX) at a negative polarity as observed in the transmission portion 30 and at a positive polarity as observed in the reflection portion 31 is applied to the pixel electrode (PIX). The negative polarity means herein that the potential on the pixel electrode (PIX) is lower than the potential on the counter electrode (CT) irrespective of the potential on the pixel electrode (PIX) being higher or lower than 0 V. In the same manner, the positive polarity means herein that the potential on the pixel electrode (PIX) is higher than the potential on the counter electrode (CT) irrespective that the potential on the pixel electrode (PIX) is higher or lower than 0 V.

In the same manner, in the sub-pixel shown by B in FIG. 22, a reference voltage (V-CT-L) at an L level is applied to the counter electrode (CT) of the transmission portion 30, and a reference voltage (V-CT-H) at an H level is applied to the counter electrode (CT) of the reflection portion 31. Further, in the sub-pixel shown by B in FIG. 22, a video voltage (V-PX) at a positive polarity as observed in the transmission portion 30 and at a negative polarity as observed in the reflection portion 31 is applied to the pixel electrode (PIX).

The video voltage (V-PX) applied to the pixel electrode (PIX) is at a potential between the reference voltage at an H level (V-CT-H) and a reference voltage (V-CT-L) at an L level.

Accordingly, in the sub-pixels shown by A, B in FIG. 22, the potential difference (Va in FIG. 23) between the pixel electrode (PIX) and the counter electrode (CT) increases in the transmission portion 30 and the potential difference (Vb in FIG. 23) between the pixel electrode (PIX) and the counter electrode (CT) decreases in the reflection portion 31.

Accordingly, in a case where the potential shown in FIG. 23 is applied, the transmission portion 30 becomes bright since the potential difference Va between the pixel electrode (PIX) and the counter electrode (CT) is large. In this case, the reflection portion 31 also becomes bright since the potential difference Vb is small between the pixel electrode (PIX) and the counter electrode (CT).

Then, when the potential on the pixel electrode (PIX) (potential of a video signal) is changed to a potential different from that in FIG. 23 and the potential difference (Va) between the pixel electrode (PIX) and the counter electrode (CT) is further increased, since the potential difference Vb between the pixel electrode (PIX) and the counter electrode (CT) is further decreased, both the transmission portion 30 and the reflection portion 31 become brighter.

On the contrary, when the potential on the pixel electrode (PIX) (potential of video signal) is changed to a potential different from that in FIG. 23 to decrease the potential difference Va between the pixel electrode (PIX) and the counter electrode (CT) in the transmission portion 30, since the potential difference Vb between the pixel electrode (PIX) and the counter electrode (CT) increases in the reflection portion 31, both the transmission portion 30 and the reflection portion 31 become dark.

As described above, since the counter electrode (CT) is bisected into the transmission portion and the reflection portion in the 1 sub-pixel and reference voltages of opposite polarities (the opposite polarity means that when one is at an H level, the other is at an L level) are applied to the counter electrode (CT) of the transmission portion 30 and the counter electrode (CT) of the reflection portion 31 respectively, bright/dark reversal between the transmission portion 30 and the reflection portion 31 can be prevented. That is, while the transmission portion 30 is normally black and the reflection portion 31 is normally white, the problem of bright/dark reversal can be overcome by considering the voltage applied to the counter electrode (CT) of the reflection portion 31.

FIRST EMBODIMENT

FIG. 1A is a plan view showing an electrode structure of a sub-pixel in a transflective liquid crystal display device of a first embodiment according to the invention.

Figure 1B:
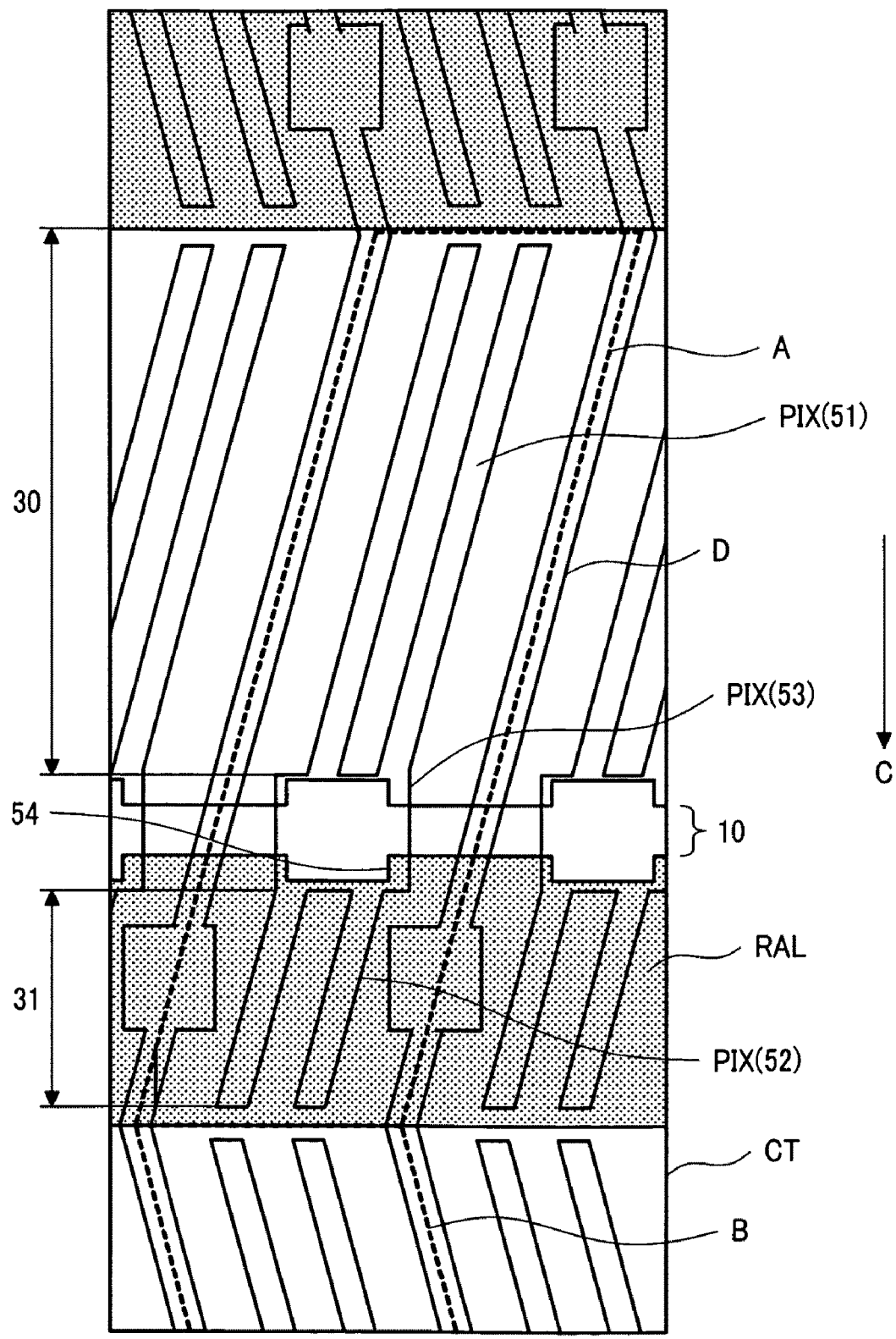
FIG. 1B is a view showing only a pixel electrode, a counter electrode, a reflection electrode and a video line among those shown in FIG. 1A.

FIG. 1B is a view showing only the pixel electrode, counter electrode, reflection electrode, and video line among those shown in FIG. 1A. In FIG. 1B, portions shown by dotted line frames A, B show 1 sub-pixel respectively.

As shown in FIG. 1B, also in the first embodiment, the pixel electrode (PIX) is common in the 1 sub-pixel, the counter electrodes (CT) are independent between the transmission portion 30 and the reflection portion 31. That is, the counter electrode (CT) is bisected to the transmission portion and the. reflection portion. Then, a reflection electrode (RAL) is formed above the counter electrode (CT) of the reflection portion 31.

FIG. 1B illustrates a case of constituting a counter electrode (CT) of the reflection portion 31 in one display line (display line having sub-pixel shown by A in FIG. 1B) and a counter electrode (CT) of the transmission portion 30 in the other display line (display line having a sub-pixel shown by B in FIG. 1B) of two adjacent display lines with a common electrode. Further, an arrow C in FIG. 1B shows a scanning direction The pixel electrode (PIX) comprises a connection portion 53, a comb-shaped electrode of the transmission portion (plural linear portions) 51 formed on both sides of the connection portion 53, and a comb-shaped electrode (plural linear portion) 52 of the reflection portion. Then, a contact hole to be described later is formed in the region of the connection portion 53.

Further, recesses 54 for forming contact holes are disposed to the opposed sides of the counter electrode (CT).

Figure 2:
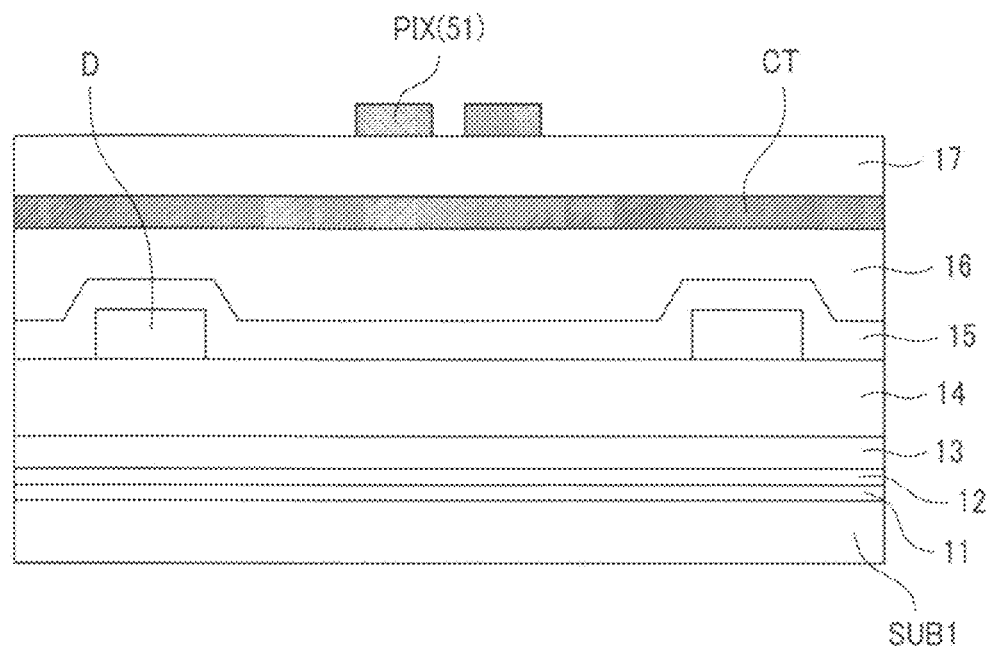
FIG. 2 is a cross sectional view for a main portion showing a cross sectional structure along line A-A' in FIG. 1A.

FIG. 2 is a cross sectional view for a main portion showing a cross sectional structure along line A-A' in FIG. 1A.

Figure 3:
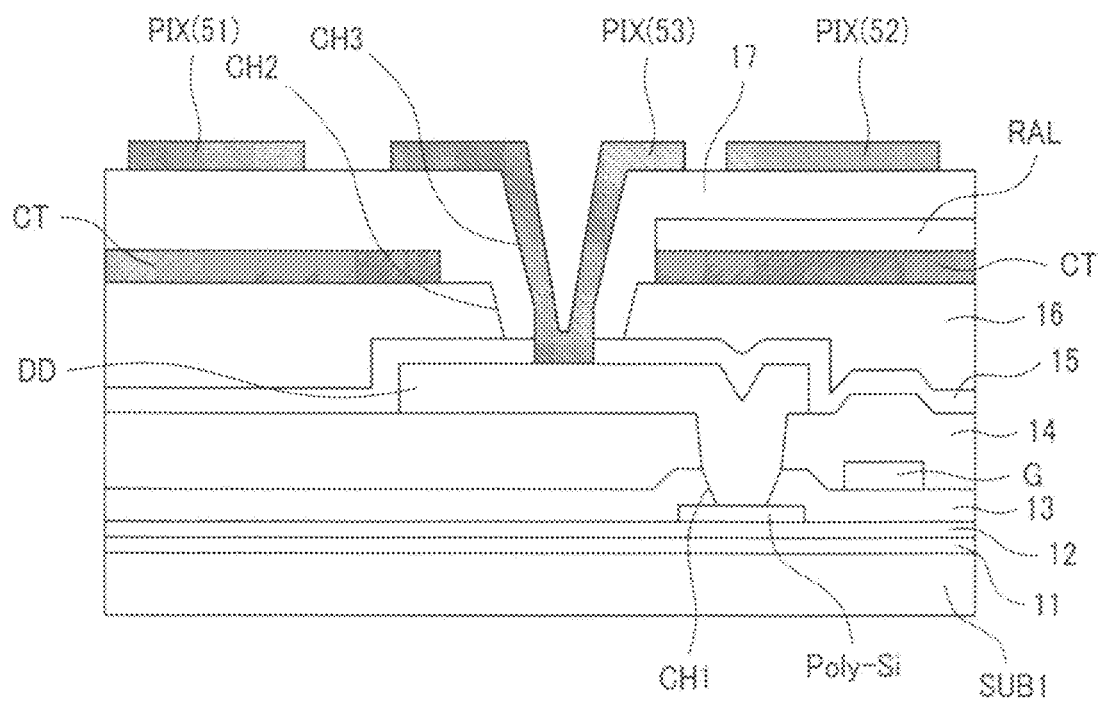
FIG. 3 is a cross sectional view for a main portion showing a cross sectional structure along line B-B' in FIG. 1A.
Figure 4:
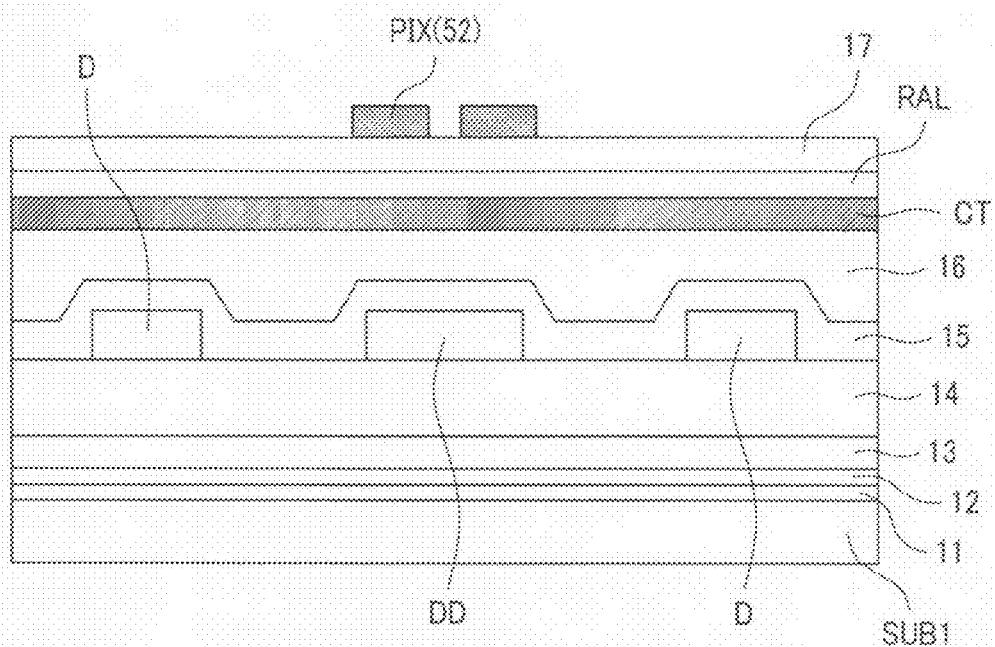
FIG. 4 is a cross sectional view for a main portion showing a cross sectional structure along line C-C' in FIG. 1A.

FIG. 3 is a cross sectional view for a main portion showing a cross sectional structure along line B-B' in FIG. 1A, FIG. 4 is a cross sectional view for a main portion showing a cross sectional structure along line C-C' in FIG. 1A.

Figure 5:
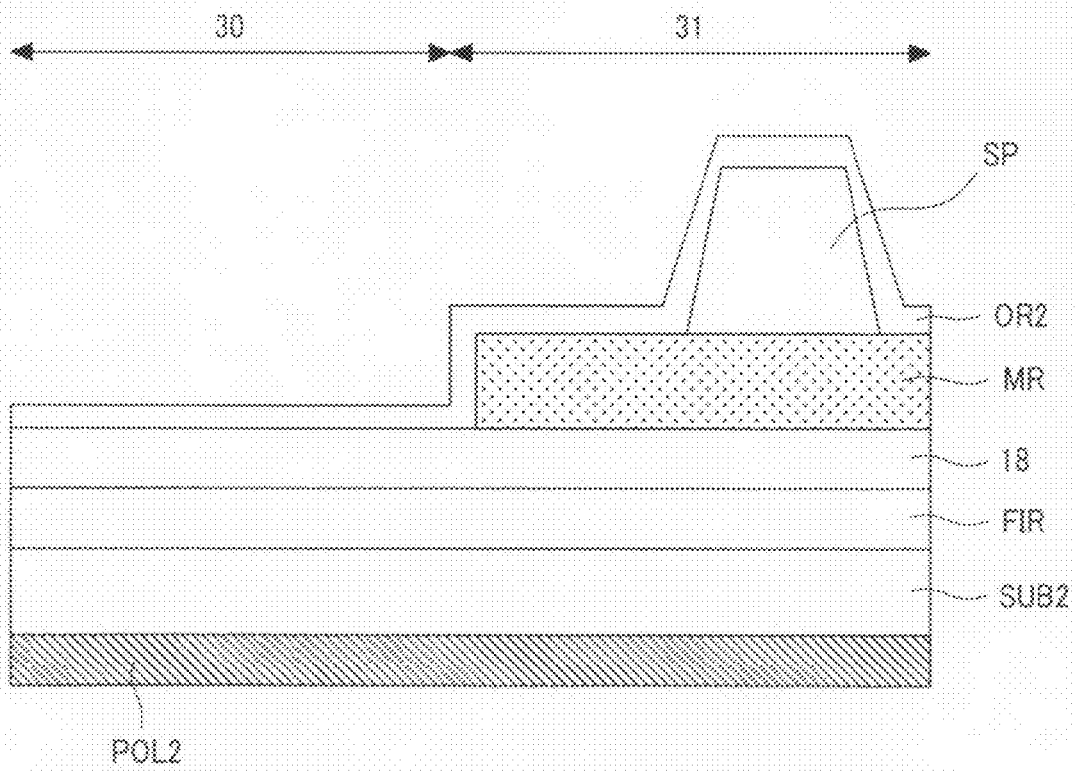
FIG. 5 is a cross sectional view for a main portion showing a cross sectional structure on the side of a substrate provided with a support spacer shown in FIG. 1A.
Figure 6:
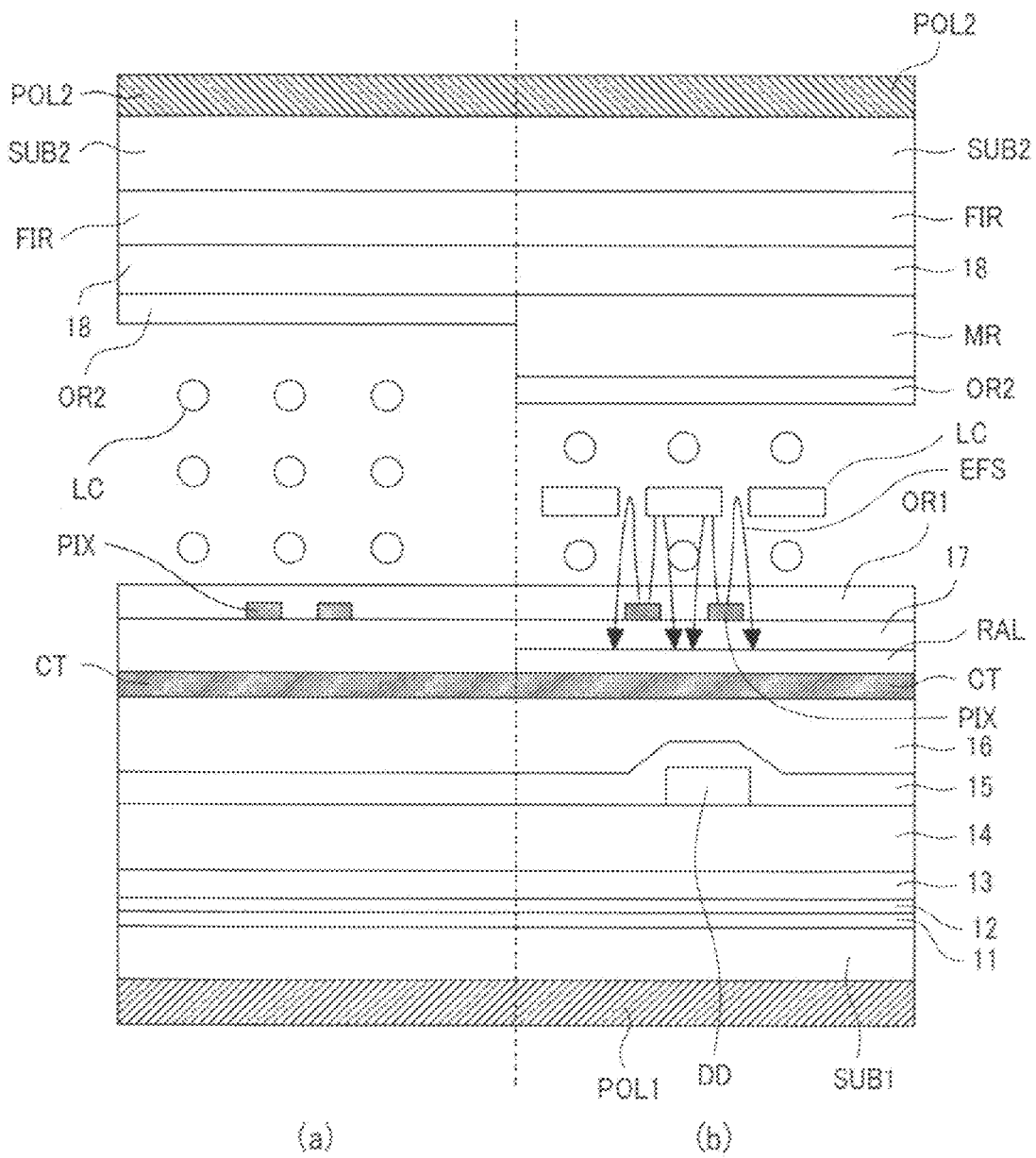
FIG. 6 is a cross sectional view for a main portion showing a cross sectional structure along line D-D' and line E-E' in FIG. 1A.

FIG. 5 is a cross sectional view for a main portion showing a cross sectional structure on the side of a substrate in which a support spacer shown in FIG. 1A is disposed, and FIG. 6 is a cross sectional view for a main portion showing a cross sectional structure along line D-D' in FIG. 1A and along line E-E' in FIG. 1A.

FIG. 6($a$) shows a cross sectional structure along line D-D' in FIG. 1A, that is, a cross sectional structure for the transmission portion 30 and FIG. 6($b$) shows a cross sectional structure along line E-E' in FIG. 1A, that is, a cross sectional structure for the reflection portion 31.

The entire structure of a transflective liquid crystal display device of the first embodiment is to be described with reference to FIG. 2 to FIG. 6.

In the first embodiment, as shown in FIG. 6, a pair of glass substrates (SUB1 and SUB2) are disposed sandwiching a liquid crystal layer (LC) containing a number of liquid crystal molecules. In this case, the main surface of the glass substrate (SUB2) forms a view side.

On the side of the glass substrate (SUB2) for the transmission portion 30 (FIG. 6(a)), a black matrix (not illustrated), a color filter (FIR), an insulative film 18, and an alignment film (OR2) are formed successively from the glass substrate (SUB2) toward the liquid crystal layer (LC).

The constitution of the reflection portion 31 (FIG. 6(b)) on the side of the glass substrate (SUB2) is identical with that of the transmission portion 30 excepting that a step forming layer (MR) is formed between the insulative film 18 and the alignment film (OR2). A polarization plate (POL2) is disposed to the outside of the glass substrate (SUB2).

Further, on the side of the glass substrate (SUB1) of the transmission portion 30 (FIG. 6(a)), interlayer insulative films (11 to 16), a counter electrode (CT), an interlayer insulative film 17, a pixel electrode (PIX), and an alignment film (OR1) are formed successively from the glass substrate (SUB1) toward the liquid crystal layer (LC).

The constitution of the reflection portion 31 (FIG. 6(b)) on the side of the glass substrate (SUB1) is identical with that of the transmission portion 30 excepting that the reflection electrode (RAL) is formed between the counter electrode (CT) and the interlayer insulative film 17. A polarization plate (POL1) is disposed also to the outside of the glass substrate (SUB1).

In FIG. 1A to FIG. 6, are shown a video line D (also referred to as a source line), a scanning line B (also referred to as a gate line), a semiconductor layer Poly-Si, a drain electrode DD of a thin film transistor, contact holes CH1 to CH3, and electric flux lines EFS.

The pixel electrode (PIX) and the counter electrode (CT) are formed, for example, of a transparent conductive film such as of ITO (Indium Tin Oxide).

Further, the counter electrode (CT) is formed in a planar shape, and the pixel electrode (PIX) and the counter electrode (CT) are superimposed by way of the interlayer insulative film 17 thereby forming a holding capacitance.

The step forming layer (MR) is used for adjusting the cell gap length (d) of the liquid crystal layer (LC) of the reflection portion such that the optical channel length of a light in the reflection portion 31 has an optical channel length corresponding to a $\lambda/4$ wavelength for one-way. Further, the reflection electrode. (RAL) is formed, for example, of a metal film of aluminum (Al) but this is not restrictive and it may have a two-layer structure comprising molybdenum (Mo) as a lower layer and aluminum (Al) as an upper layer.

A method of manufacturing each of the portions in FIG. 2 to FIG. 6 is to be described. At first, manufacture for each of the portions on the side of the glass substrate (SUB1) is to be described. Since steps before (1) are identical with usual steps, description therefor is to be omitted.

(1) Video Line (D), Drain Electrode (DD) for Thin Film Transistor, Interlayer Insulative Film 15

For forming a video line (D) and a drain electrode (DD) of a thin film transistor, a lower layer Ti, an intermediate layer Al, and an upper layer Ti are formed and patterned. Then, an SiN film is formed to a thickness of 200 nm by CVD to form an interlayer insulative film 15.

(2) Interlayer Insulative Film 16

After depositing the interlayer insulative film 15, a photosensitive resin is coated and exposed. by using a photomask drawn with a desired pattern as a mask and the resist was partially removed with an alkali developer. In this case, a resist for a portion corresponding to a contact hole (CH2) is removed.

Depending on the baking condition for the resin, unevenness on the surface of the substrate can be controlled, and the baking condition was set to 230° C. for 60 min such that the surface of the substrate was substantially planar except for the portion of the contact hole in the first embodiment.

Further, the thickness of the interlayer insulative film 16 is about 1.8 μm (surface planar portion of the pixel electrode (other than the portion of contact hole)) after baking.

(3) Counter Electrode (CT)

After forming amorphous ITO (77 nm) by sputtering, a photosensitive resist is coated. Exposure is applied by using a photomask drawn with a desired pattern as a mask and the resist is partially removed by an alkali developer (exposed portion is removed in a case of a positive type resist). ITO is removed by an etching solution for etching (for example, oxalic acid) using the pattern of the resist as a mask. In the first embodiment, the pattern is designed such that the contact hole (CH3) situates between the opposed counter electrodes (CT).

Then, the resist is removed by a resist peeling liquid (for example, MEA (monoethanol amine)). Finally, a heat treatment at 230° C., 60 min was applied to crystallize amorphous ITO such that amorphous ITO is not dissolved by an acidic solution used for the fabrication of a reflection electrode (RAL: upper layer AlSi/lower layer MoW) to be formed in the succeeding step.

(4) Reflection Electrode (RAL)

After forming a lower layer MoW (50 nm) and an upper layer AlSi (150 nm) in this order, by sputtering, a photosensitive resist is coated. Exposure is applied by using a photomask drawn with a desired pattern as a mask and the resist is removed partially with an alkali developer (exposed portion is removed in a case of a positive type resist). It is removed with an etching solution for etching the reflection electrode (RAL) using the pattern of the resist as a mask.

Then, the resist is removed by a resist peeling solution (for example, MEA (monoethanol amine)). In this embodiment, a resist pattern is designed such that the reflection electrode (RAL) is formed only on one of the counter electrodes (CT) near the contact hole (CH3).

(5) Interlayer Insulative Film 17

This is formed in the same method as for the interlayer insulative film 16. However, in this embodiment, an interlayer insulative film 17 is formed also on the inside of the contact hole (CH2), a hole is apertured to the interlayer insulative film 17 and the interlayer insulative film 15 in the underlayer is fabricated by utilizing the pattern to form a contact hole (CH3). For the fabrication of the interlayer insulative film 15, dry etching was applied with a gas of ($SF_6+O_2$) or $CF_4$.

(6) Pixel electrode (PIX);

After forming ITO (77 nm) by sputtering, a photosensitive resist is coated and exposed by using a photomask drawn with a desired pattern as a mask, and the resist is partially removed with an alkali developer (exposed portion is removed in a case f a positive type resist). ITO is removed with an etching solution for etching ITO (for example, oxalic acid) for etching ITO. Then, the resist is removed by a resist peeling solution (for example, MEA (monoethanol amine)). The pixel electrode (PIX) is formed in a comb-like pattern on the counter electrode (CT).

Then, manufacture for each of the portions on the side of the glass substrate (SUB2) is to be described with reference to FIG. 5. In the manufacture on the side of the glass substrate (SUB2), since a step forming layer (MR) is disposed after the fabrication of a color filter (FIR) in order to make the cell gap length of the transmission portion 30 greater than the cell gap length of the reflection portion 31, this is to be described. Since other steps than those described above are identical with the usual case, the description is to be omitted.

(7) Step Forming Layer (MR)

After forming an insulative film 18 on the side of the glass substrate (SUB2), a photosensitive resist is applied. Exposure is applied by using a photomask drawn with a desired pattern as a mask and a resist is partially removed by an alkali developer (exposed portion is removed in a case of a positive type photosensitive resist). The resist is baked in an atmospheric air at 230° C. for 60 min. The thickness of the step forming layer (MR) is 16 µm after baking. Further, the step forming layer (MR) is formed only for the reflection portion 31.

(8) Support Spacer (SP)

After forming the step forming layer (MR), a photosensitive resist is coated. Exposure is applied by using a photomask drawn with a desired pattern as a mask, and the resist is removed partially with an alkali developer (the exposed portion is removed in a case of a positive type photosensitive resist). The resist was baked in an atmospheric air at 230° C. for 60 min. The height of the support spacer (SP) is 2.4 µm after baking.

Figure 8:
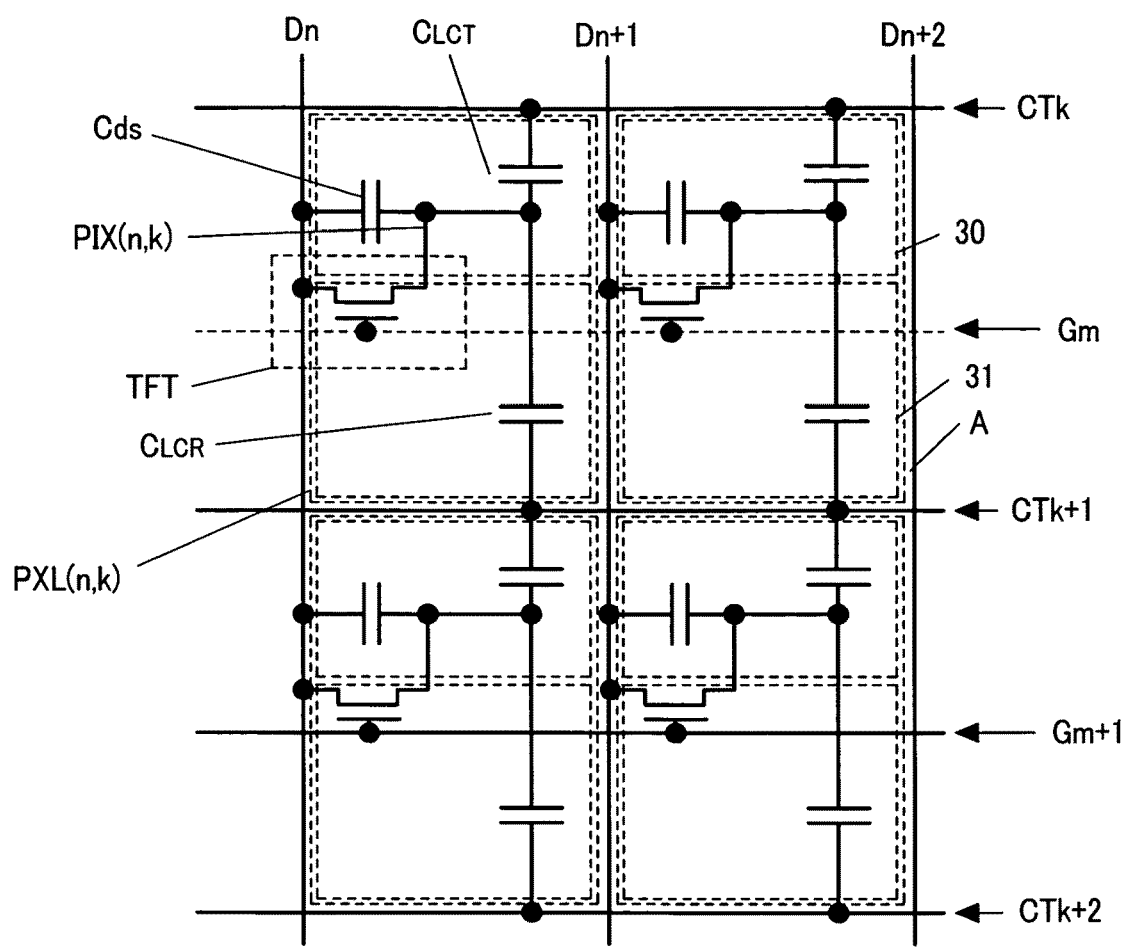
FIG. 8 is a view showing an equivalent circuit for a liquid crystal display panel of a transflective liquid crystal display device as a first embodiment of the invention.

FIG. 8 shows an equivalent circuit of a liquid crystal display panel of a transflective liquid crystal display device according to the first embodiment.

In FIG. 8, are shown $n_{th}$, $(n+1)_{th}$, and $(n+2)_{th}$ video lines as DN, Dn+1, and Dn+2 respectively, $m_{th}$, and $(m+1)_{th}$ scanning lines as Gm, and Gm+1, $k_{th}$, $(k+1)_{th}$, and $(k+2)_{th}$ counter electrodes as CTk, CTk+1, and CTk+2 respectively, a 1 sub-pixel as A, a liquid crystal capacitance of the transmission portion 30 as CLCT, the liquid crystal capacitance of the reflection portion 31 as CLCR, a parasitic capacitance between the video line (D) and drain electrode of the thin film transistor (TFT) as Cds.

The direction along which the video line (D) extends and the direction along which the scanning line (G) and the counter electrode (CT) extend intersect or cross to each other. Further, the counter electrodes (CT) are arranged in a stripe pattern.

The source electrode of the thin film transistor (TFT) is connected to the video line (D), the drain electrode (DD) of the thin film transistor (TFT) is connected to the pixel electrode (PIX), and the voltage on the video line (D) is supplied to the pixel electrode (PIX) by way of the thin film transistor (TFT).

The gate electrode of the thin film transistor (TFT) is connected to the scanning line (G), and the scanning line (G) causes the thin film transistor (TFT) to turn on and off.

In this embodiment, while the pixel electrode (PIX) is in common with the transmission portion 30 and the reflection portion 31, the counter electrodes (CT) are different and the potential of the counter electrode (CT) is also different between the transmission portion 30 and the reflection portion 31 in the 1 sub-pixel.

When the voltage on the scanning line (Gm) turns to the High level, the thin film transistor (TFT) turns on to write a video potential to the pixel electrode (PIX (n, k)).

Also after the voltage on the scanning line (Gm) turns to the Low level, the voltage written during the High level kept by the holding capacitance disposed in the sub-pixel (PXL) till the scanning line (Gm) turns to the High level at the next frame. As described above, the holding capacitance is constituted with a counter electrode (CT) formed in a planar shape, a pixel electrode (PIX), and an interlayer insulative film 17 formed between the counter electrode (CT) and the pixel electrode (PIX).

Voltage levels on the counter electrode (CTk) and the counter electrode (CTk+1) are different respectively and, for example, when the counter electrode (CTk) is at the H level, the counter electrode (CTk+1) is at the Low level (excluding the case just before the scanning line (Gm) turns to the H level).

Liquid crystal molecules (liquid crystal layer LC) of the transmission portion 30 are driven by the potential difference between the counter electrode (CTk) and the pixel electrode (PIX (n, k)), and liquid crystal molecules (LC) of the reflection portion 31 are driven by the counter electrode (CTk+1) and the pixel electrode (PIX (n, k)).

In the first embodiment, the voltage applied to the liquid crystal molecules in each of the transmission portion 30 and the reflection portion 31 is controlled as described above.

Presence of the parasitic capacitance (Cds) formed between the video line (D) and the drain electrode (DD) of the thin film transistor (TFT) causes uneven display due to association of the pixel electrode potential to the potential change of the video line (D) in the off state of the thin film transistor (TFT). In a case where the parasitic capacitance (Cds) varies between the sub-pixels, uneven display occurs remarkably. In the foregoing descriptions, it is assumed that the fluctuation of the pixel electrode potential is not present by designing the parasitic capacitance (Cds) sufficiently small.

Figure 9:
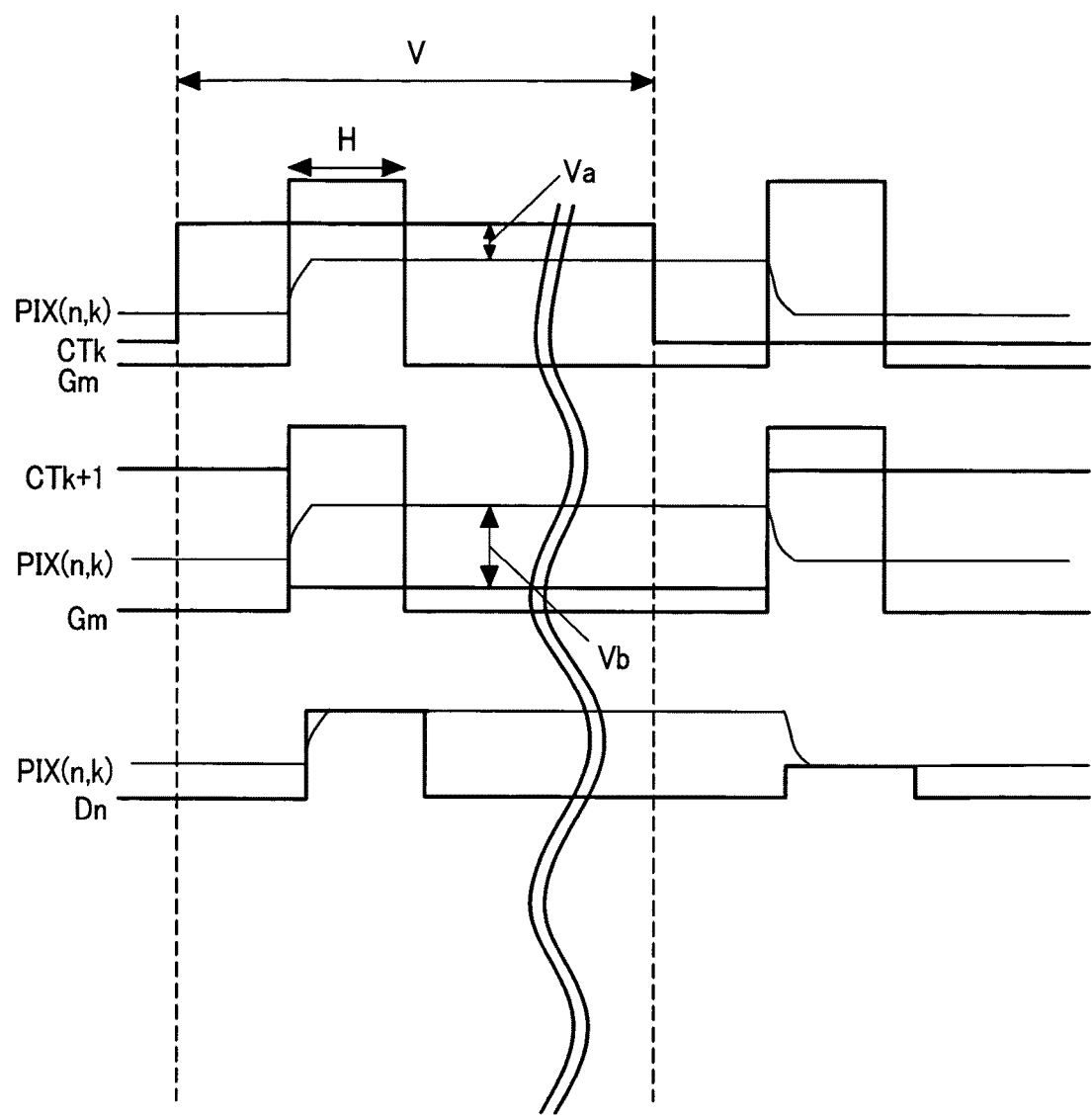
FIG. 9 is a view showing a voltage waveform in a sub-pixel (PIX(n, k)) shown in FIG. 8.

FIG. 9 shows a voltage waveform of sub-pixels (PIX (n, k)) shown in FIG. 8. In FIG. 9, Va is a potential difference between the pixel electrode (PIX) and the counter electrode (CT) in the transmission portion 30, and Vb is a potential difference between the pixel electrode (PIX) and the counter electrode (CT) in the reflection portion 31. Further, H is 1 horizontal scanning period and V is 1 vertical scanning period (frame period). Further, Gm is a scanning signal, Dn is a video signal, PIX (n, k) is a potential for the pixel electrode (PIX), and CTk, CTk+1 are potentials of the counter electrode (CT).

Referring further to the first embodiment, as shown in FIG. 6, a step forming layer (MR) is formed on the side of the glass substrate SUB1 for adjusting the retardation (Δn☐d) for the transmission portion 30 and the reflection portion 31. In the first embodiment, the retardation (Δn☐d) of the transmission portion 30 is 320 nm by setting the cell gap length (dt) of the transmission portion 30 to 4 µm, and the retardation (Δn☐d) of the reflection portion 31 was 192 nm by setting the cell gap length (dr) of the reflection portion 31 to 2.4 µm. Δn is a anisotropy diffraction index of the liquid crystal (Δn=0.08 in this embodiment), and d is a liquid crystal cell gap length. Further, positive type liquid crystals are used.

Further, as shown in FIG. 6, a polarization plate (POL2) is disposed to the outside (upper side in the drawing) of the glass substrate (SUB2) and a polarization plate (POL1) is disposed to the outer side (lower side in the drawing) of the glass substrate (SUB1). The relation between each of polarization axes of the upper polarization plate (POL2) and the lower polarization plate (POL1) and the initial alignment axis (rubbing axis) of the liquid crystals may be such that the polarization axis of either upper or lower polarization plate and the liquid crystal initial alignment axis are aligned and the polarization axes of the upper and lower polarization plates cross to each other, by which normally black display can be attained. the first embodiment, in a case where liquid crystals are positive type, the rubbing axis (S) is in the direction of 90°, the polarization axis of the upper polarization plate (POL2) is 0° being perpendicular to the initial alignment axis (rubbing axis) of the liquid crystal, and the polarization axis of the lower polarization plate (POL1) is 90° being perpendicular to the polarization axis of the upper polarization. plate (POL2), thereby providing normally black display in the transmission portion 30. 0° and 90° are indicated by angles measured in the counterclockwise direction with the horizontal direction (extending direction of scanning line G) being 0°. The polarization plate (POL2) may be set to 90° and the polarization plate (POL1) may be set to 0°.

Since the axis is set as described above both for the transmission portion 30 and the reflection portion 31, a light incident from the side of the glass substrate (SUB2) and reflected at the reflection electrode (RAL) is not changed in the state of polarization by the liquid crystals in the optical channel thereof when an electric field is not applied to the liquid crystal, it passes the upper polarization plate (POL2). That is, the display in the reflection portion 31 is normally white.

In view of the image quality, it is preferred that the state of display is aligned between the transmission portion 30 and the reflection portion 31. That is, it is preferred that in a case where the display in the transmission portion 30 is black display, the display in the reflection portion 31 is also black display, and in a case where the display of the transmission portion 30 is white display, the display in the reflection portion 31 is also white display.

Then, driving for liquid crystal is controlled independently for the transmission portion 30 and the reflection portion 31 by making the pixel electrode (PIX) in common with the transmission portion 30 and the reflection portion 31, and the counter electrode (CT) is bisected into the counter electrode (CT) of the transmission portion 30 and the counter electrode (CT) of the reflection portion 31.

FIG. 6 is a view showing the state of attaining black display both in the transmission portion 30 and the reflection portion 31 by not generating an electric field to the pixel electrode (PIX) (51) and the counter electrode (CT) of the transmission portion 30 and an electric field is generated only to the pixel electrode (PIX) (52) and the counter electrode (CT) of the reflection portion 31.

By the way, as in the first embodiment, when the counter electrode (CT) is bisected to the transmission portion 30 and the reflection portion 31 in a 1 sub-pixel, since the applied voltages are different from each other, an electric field is normally generated between the counter electrode (CT) of the transmission portion 30 and the counter electrode (CT) of the reflection portion 31 at a clearance between (or gap) 10 between the opposed counter electrodes (CT) (refer to FIG. 1A) (since CTk and CTk+1 are at potentials different from each other). Since the transmission portion 30 is normally black, it is assumed that an electric field is not generated between the pixel electrode (PIX) and the counter electrode (CT) of the transmission portion 30 upon black-display in the transmission portion 30 and, in a case where the electric field between the counter electrode (CT) of the transmission portion 30 and the counter electrode (CT) of the reflection portion 31 leaks to the transmission portion 30, liquid crystals are rotated to form a light leakage portion and, as a result, the display quality is deteriorated.

Then, the liquid crystal initial alignment direction (S) of the liquid crystal layer (LC) is designed such that the liquid crystals of the liquid crystal layer (LC) are not driven even when an electric field is applied between the counter electrode (CT) of the transmission portion 30 and the counter electrode (CT) of the reflection portion 31. Specifically, in a case where the liquid crystal layer (LC) comprises positive type liquid crystals, the liquid crystal initial alignment direction (S) of the liquid crystal layer (LC) is in the direction within a range of ±2° in the clockwise direction relative to the direction in perpendicular to the direction (X) along which the clearance 10 between the counter electrode (CT) of the transmission portion 30 and the counter electrode (CT) of the reflection portion 31 extends (refer to FIG. 1A), or to the direction (Y) perpendicular to the direction (X) along which the clearance 10 extends. This means that the direction of the electric field generated between the counter electrode (CT) of the transmission portion 30 and the counter electrode (CT) of the reflection portion 31 is aligned with the liquid crystal initial alignment direction (S) and since liquid crystals in the transmission portion 30 do not move even when the electric field leakage to the transmission portion 30 should occur upon black display, light leakage does not occur. Accordingly, it possible to improve the display quality of the transflective liquid crystal display device.

In a case where the liquid crystal layer (LC) comprise negative type liquid crystals, the liquid crystal initial alignment direction (S) of the liquid crystal layer (LC) is made in parallel with the direction (X) along which the clearance 10 between the counter electrode (CT) of the transmission portion 30 and the counter electrode (CT) of the reflection portion 31 extends, or in the direction within a range of ±2° in the clockwise direction relative to the direction (X) along which the clearance 10 extends. Also in this case, since liquid crystals of the transmission portion 30 do not move even when the electric field leakage should occur to the transmission portion 30 upon black display, light leakage does not occur. Accordingly, it is possible to improve the display quality of transflective liquid crystal display device.

On the other hand, for attaining the white display by generating an electric field between the pixel electrode (PIX) and the counter electrode (CT), it is necessary to generate an. electric field in the direction different from the liquid crystal initial alignment direction (S) of the liquid crystal layer (LC). For this purpose, the extending direction (N) of the pixel electrode (PIX) and the liquid crystal initial alignment direction (S) of the liquid crystal layer (LC) are changed.

Presence or absence of the rotation of the liquid crystal by the electric field between the counter electrode (CT) and the pixel electrode (PIX) depends on the relation between the liquid crystal initial alignment direction (S) and the direction (M) perpendicular to the extending direction (N) of the comb-shaped pixel electrode (PIX). This is because the direction of the electric field is in the direction (M).

Figure 7A:
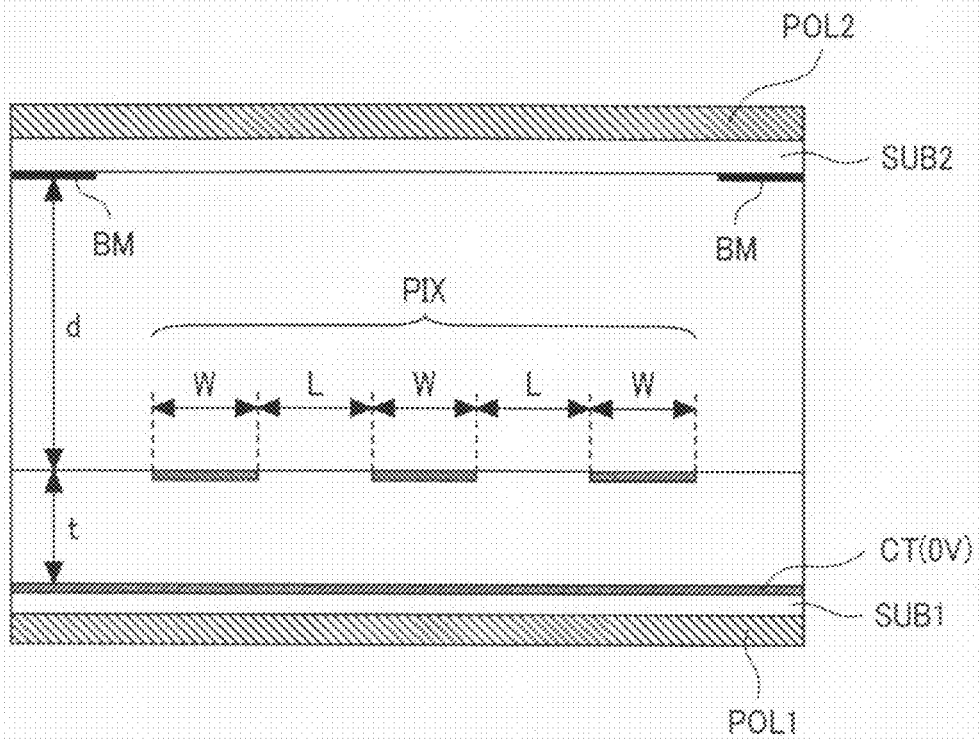
FIG. 7A is a calculation model view.
Figure 7B:
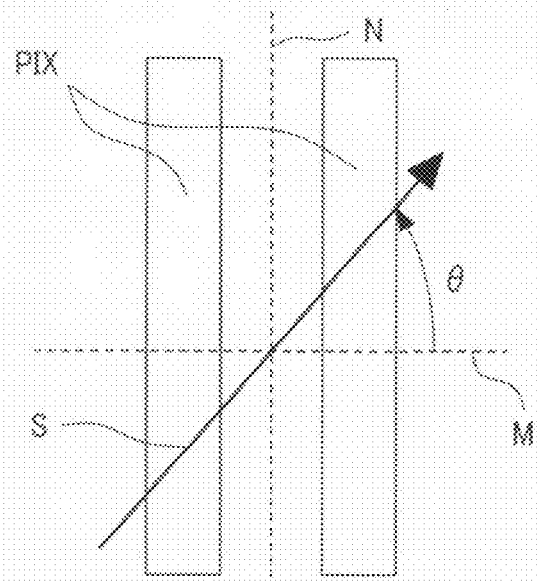
FIG. 7B is a view showing the definition of a liquid crystal initial aligning direction.
Figure 7C:
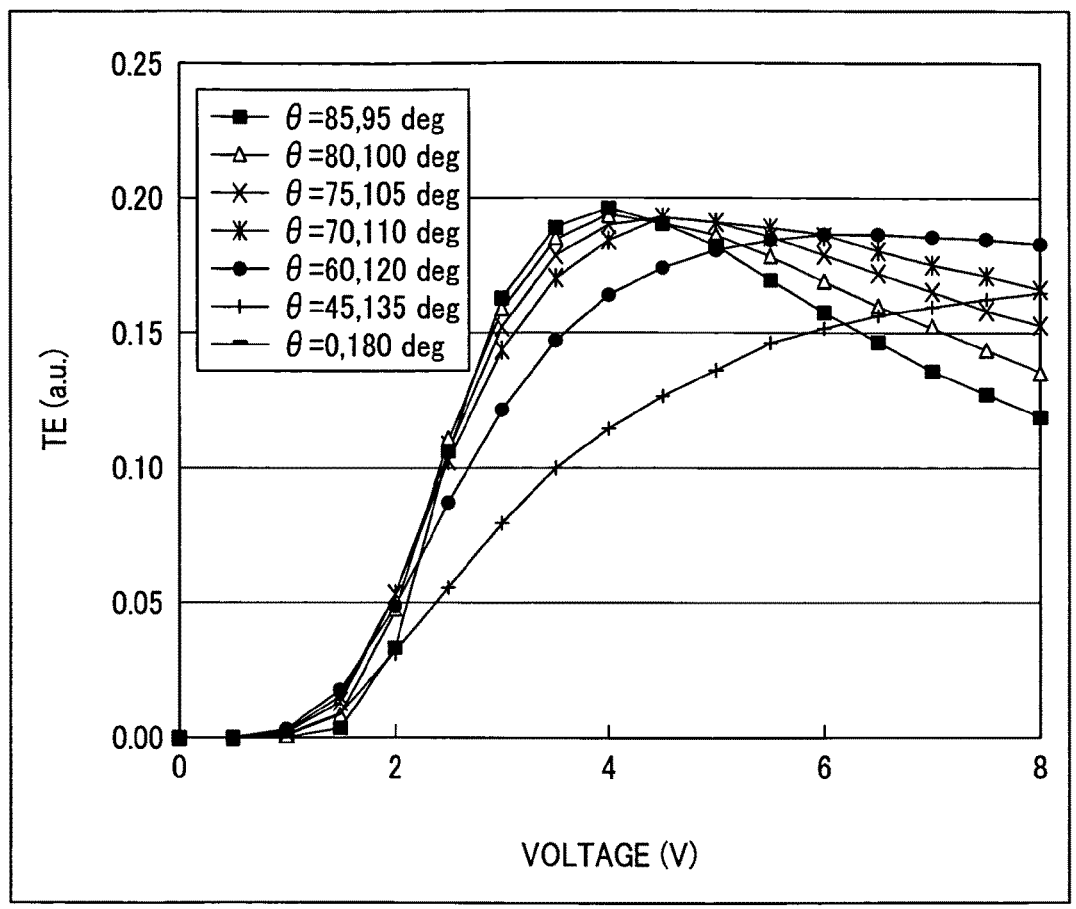
FIG. 7C is a graph showing voltage (V)-transmission efficiency (TE) characteristic.

FIG. 7C shows the voltage (V)-transmission efficiency (TE) characteristic using an angle θ formed between the liquid crystal initial alignment direction (S) and the direction (M) perpendicular to the extending direction (N) of the comb-shaped pixel electrode (PIX) as a parameter. FIG. 7A shows a calculation model used for the calculation. Further, FIG. 7B shows an angle θ formed between the liquid crystal initial alignment direction (S) and the direction (M) perpendicular to the extending direction (N) of the pixel electrode (PIX). Further, conditions used for the calculation are shown in Table 1. In FIG. 7A, BM denotes a light shielding film (black matrix) and 0 V is applied on the counter electrode (CT).

TABLE 1

| Item | Details | Symbol | | Unit | Remark |
|---|---|---|---|---|---|
| Optical film | Absorption axis of upper polarization plate | — | 90-180 | deg | Perpendicular to the initial alignment axis |
| | Absorption axis of lower polarization plate | — | 0-90 | deg | Aligned with initial alignment axis |
| Electrode | Width of comb-shaped electrode | W | 2 | μm | |
| | Clearance of comb-shaped electrode | L | 5 | μm | |
| Interlayer insulative film | Dielectric constant | ε | 3.3 | — | |
| | Film thickness | t | 0.4 | μm | |
| Liquid crystal | Anisotropy dielectric constant | Δε | 7 | — | |
| | Anisotropy diffractive index | Δn | 0.08 | — | |
| | Cell gap | d | 4 | μm | |
| | Initial alignment axis angle | θ | 0-180 | deg | Parameter |

As shown in FIG. 7C, the transmission efficiency (TE) changes along with the voltage application at the angle θ other than 0° and 180°. At θ=0° and 180°, the transmission efficiency (TE) is always 0 not depending on the voltage (V). In the first embodiment, for providing the peak of the transmission efficiency (TE) at a voltage of 4.5 V., θ was set to 75° (θ2 in FIG. 1A) or 105° (θ1 in FIG. 1A) as shown in FIG. 1A. By setting the extending direction (N) of the pixel electrode (PIX) relative to the liquid crystal initial alignment direction (S) on every sub-pixel alternately, for example, as +15° and −15° on every row, arrangement of the sub-pixels can be made as a matrix when viewed as a panel (for example, in a case where sub-pixels only with +15° are arranged, since the video lines D becomes oblique, they do not form a matrix).

In the first embodiment, the extending direction (X) of the clearance 10 between the counter electrode (CT) of the transmission portion 30 and the counter electrode (CT) of the reflection portion 31, and the extending direction (N) of the linear portion (51, 52) of the pixel electrode (PIX) are neither perpendicular nor parallel but intersect obliquely.

Further, in a planar view, a narrow angle (acute angle) θt in the angle formed between the voltage applying direction of the transmission portion 30 and the liquid crystal initial alignment direction (S) of the liquid crystal layer (LC) and a narrow angle (acute angle) θr in the angle formed between the electric field application direction of the reflection portion 31 and the liquid crystal initial alignment direction (S) of the liquid crystal layer (LC) may be different. For example, they may be different by being set as: θt=2 to 88° and θr=2 to 88° except for the vicinity of 0° and the vicinity of the 90°.

In a case of positive type liquid crystals, while the contrast increases as the acute angle (θt, θr) is larger, the driving voltage providing a peak of the contrast shifts to the lower voltage side. Accordingly, in a case where it is intended to drive by a driving voltage about at a level capable of providing the peak in order to improve the efficiency, since the driving voltage is lowered, the response is retarded more as the acute angle (θt, θr) is larger (in the case of negative type liquid crystals, response is retarded more as the acute angle (θt, θr) is smaller).

Even in a case where the required characteristics (for example, contrast, response speed, dynamic range for driving voltage, etc.) are different between the transmission portion 30 and the reflection portion 31, necessary characteristics can be satisfied by adjusting the acute angle (θt, θr). Further, in a case where it is intended to make the dynamic range of the driving voltage identical between the transmission portion 30 and the reflection portion 31, since the acute angle (θt, θr) capable of providing the maximum contrast may sometimes be different between the transmission portion 30 and the reflection portion 31, it is possible to improve the characteristic by adjusting θt and θr independently.

SECOND EMBODIMENT

Figure 10:
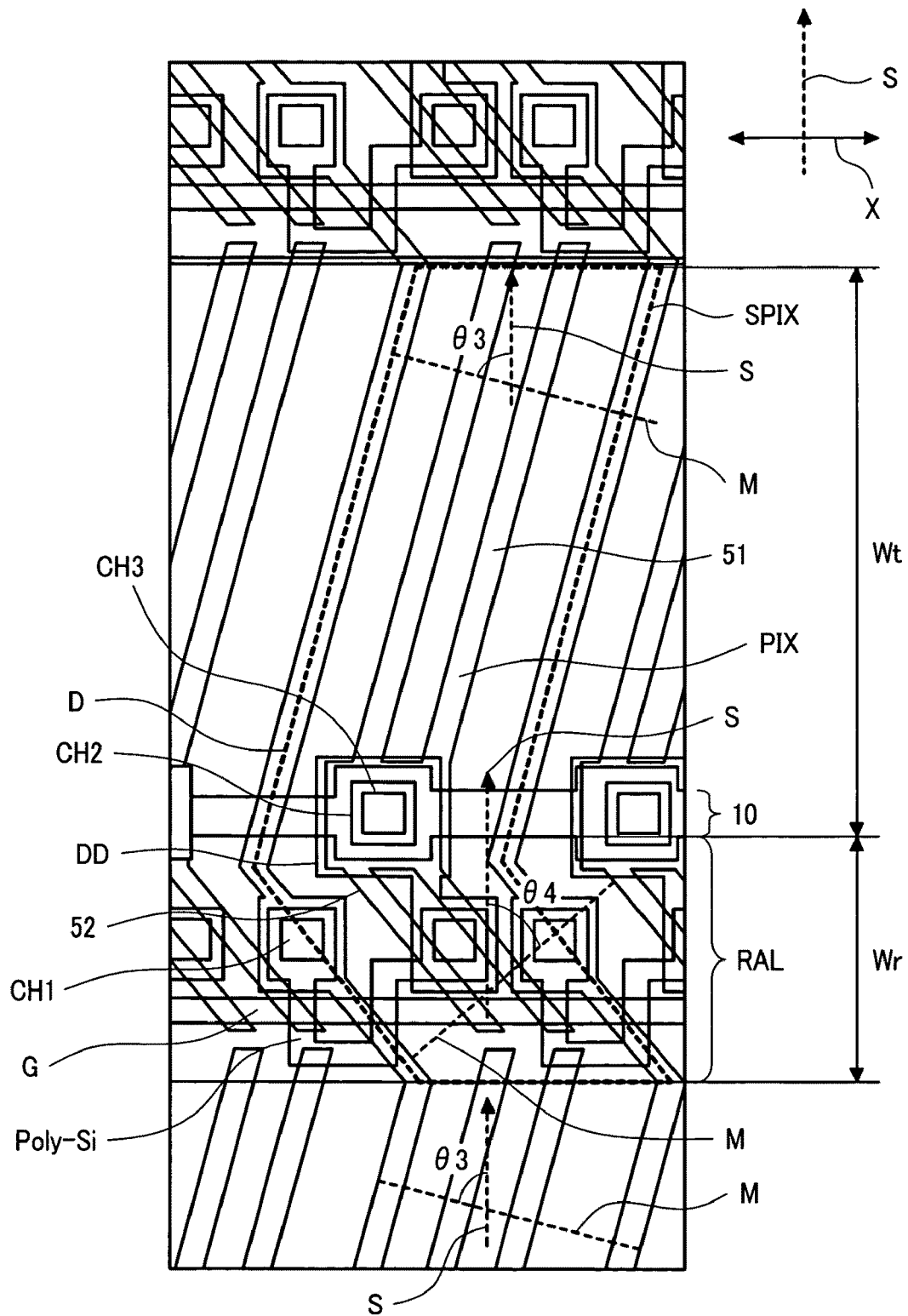
FIG. 10 is a plan view showing an electrode structure of a sub-pixel of a transflective liquid crystal display device as a second embodiment of the invention.

FIG. 10 is a plan view showing the electrode structure of a sub-pixel of a transflective liquid crystal display device as a second embodiment of the invention.

The transflective liquid crystal display device of the second embodiment basically has the same constitution as that in the first embodiment described previously and is different for the following constitutions.

That is, in the first embodiment described above, as shown in FIG. 1A and FIG. 1B, θ is made identical for the transmission portion 30 and the reflection portion 31 in the 1-sub-pixel. However, in the second embodiment as shown in FIG. 10, θ is made different between the transmission portion 30 (θ3) and the reflection portion 31 (θ4) in the 1-sub-pixel. The bending angle of the comb-shaped electrode 51 for the transmission portion and the comb-shaped electrode 52 for the reflection portion of the pixel electrode (PIX) is changed. Since θ3 and θ4 can be set optionally, the degree of freedom of design for the transmission display and the reflection display can be extended.

In the second embodiment, the video line (D) extends while bending in each of the sub-pixels overriding the transmission portion 30 and the reflection portion 31 and when adjacent two display lines are defined as one display line and the other display line, the bending direction and the bending angle of the video line (D) in the reflection portion 31 of one display line are identical with the bending direction and the bending angle of the video line (D) in the reflection portion 31 of the other display line. Since the first embodiment is not constituted as described above, way of superposition of the video line (D) and the thin film transistor (TFT) is different on every row. On the contrary, in the second embodiment, since superposition between the video line (D) and the thin film transistor (TFT) can be made identical for each row, the parasitic capacitance between the video line (D) and the thin film transistor (TFT) can be identical for each row.

Figure 11A:
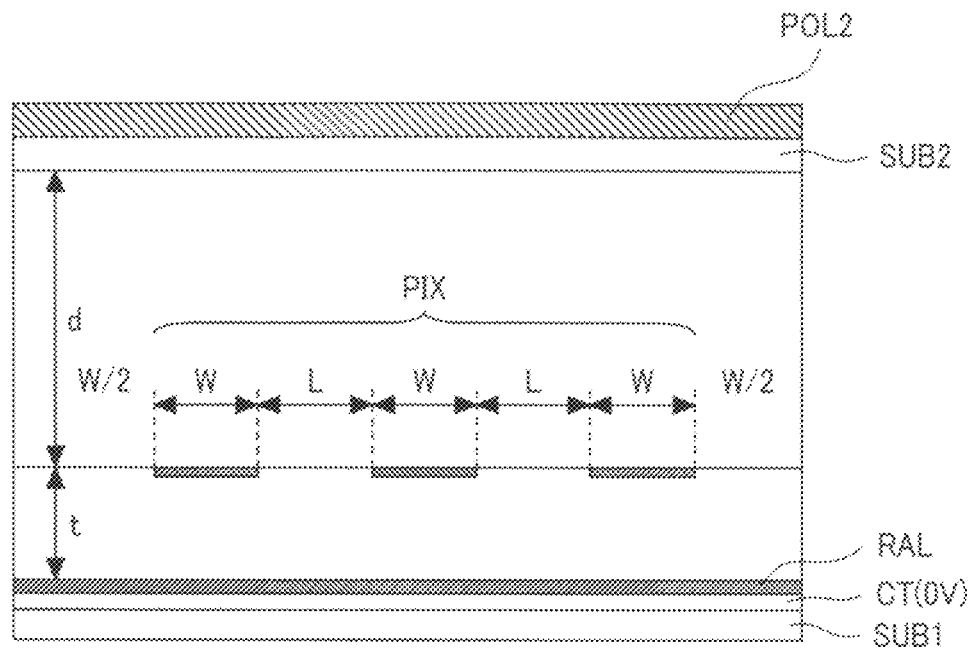
FIG. 11A is a calculation model view.
Figure 11B:
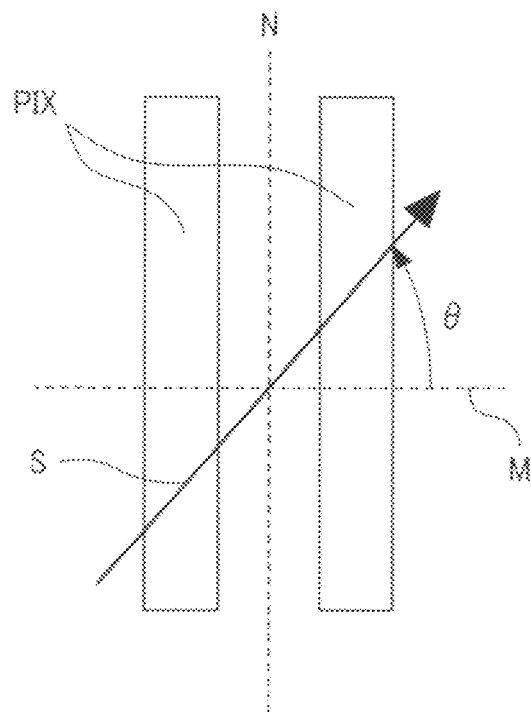
FIG. 11B is a view showing the definition for the liquid crystal initial aligning direction.
Figure 11C:
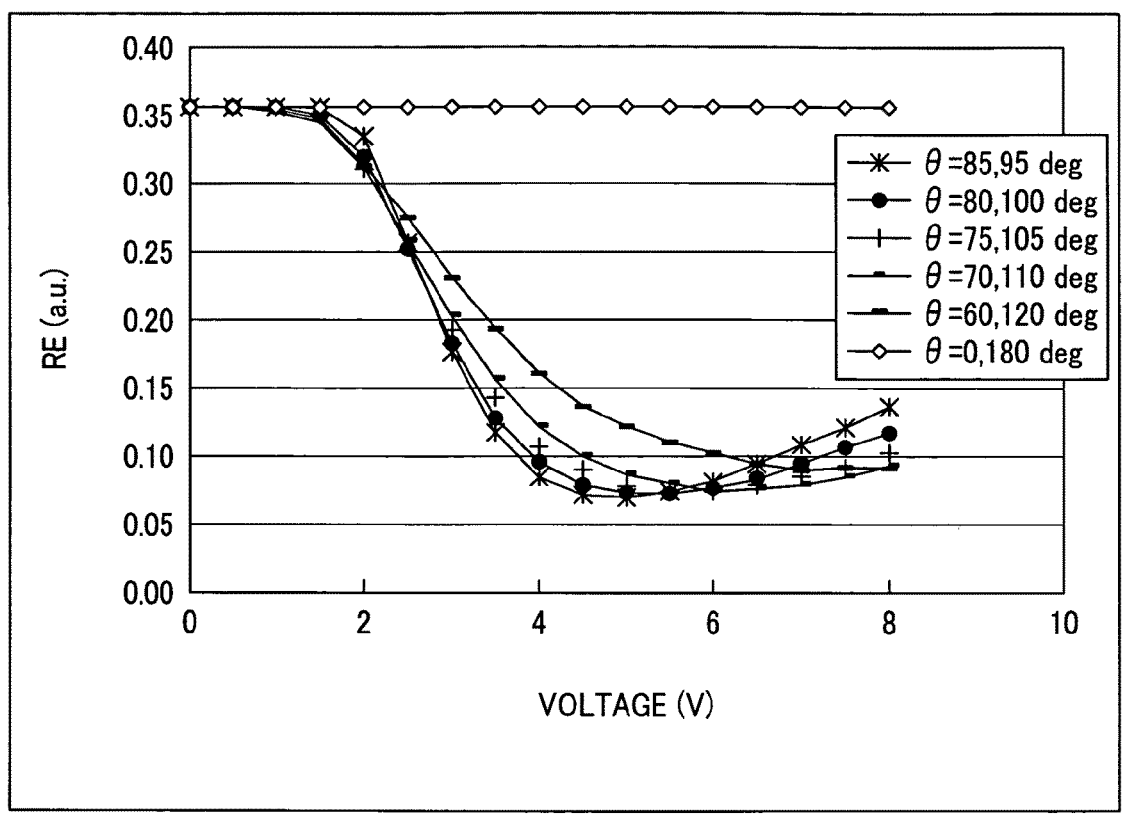
FIG. 11C is a graph showing voltage (V)-reflection efficiency (RE) characteristic.

FIG. 11C shows the voltage (V)-reflectance (RE) characteristic using an angle θ formed between the liquid crystal initial alignment direction (S) and the direction (M) perpendicular to the extending direction (N) of the comb-shaped pixel electrode (PIX) as a parameter. FIG. 11A shows a calculation model used for the calculation. Further, FIG. 11B shows an angle θ formed between the liquid crystal initial alignment direction (S) and the direction (M) perpendicular to the extending direction (N) of the pixel electrode (PIX). Further, conditions used for the calculations are shown in Table 2.

However, for the sake of a simulator, it was calculated assuming that the counter electrode (CT) is present above the reflection electrode (RAL) and 0 V is applied to the counter electrode (CT) different from FIG. 11A. The result is identical for both of them.

TABLE 2

| Item | Details | Symbol | | Unit | Remark |
|---|---|---|---|---|---|
| Optical film | Absorption axis of upper polarization plate | — | 90-180 | deg | Perpendicular to the initial alignment axis |
| Electrode | Width of comb-shaped electrode | W | 2 | μm | |
| | Clearance of comb-shaped electrode | L | 5 | μm | |
| Interlayer insulative film | Dielectric constant | $\epsilon$ | 3.3 | — | |
| | Film thickness | t | 0.4 | μm | |
| Liquid crystal | Anisotropy dielectric constant | $\Delta\epsilon$ | 7 | — | |
| | Anisotropy diffractive index | $\Delta n$ | 0.08 | — | |
| | Cell gap | d | 2.4 | μm | |
| | Initial alignment axis angle | $\theta$ | 0-180 | deg | Parameter |

As shown in FIG. 11C, it can be seen that the reflectance changes along with voltage application at angle θ other than 0° and 180°. In the second embodiment, it is preferred to set θ4 to 85° in order to provide a peak for the reflectance (RE) at a voltage of 4.5 V. However, when an importance is attached to the transmission display, θ4 may also be decided so as to make-up the bending of the pixel electrode (PIX) in the direction X by θ3. The relation is as described below.

$$\theta4 = \tan^{-1}((Wr/Wt)\cdot \tan \theta3)$$

Wr: width for reflection portion (width for arranging the reflection electrode)
Wt: width for transmission portion (width for not arranging the reflection electrode)

In the second embodiment, when setting as: θ3=105° or 75° according to the first embodiment, θ4 is 58°. θ3 may also be calculated after previously determining θ4.

Also in the second embodiment constituted as described above, it is possible to improve the display quality of the transflective liquid crystal display device like in the first embodiment described above.

THIRD EMBODIMENT

Figure 12:
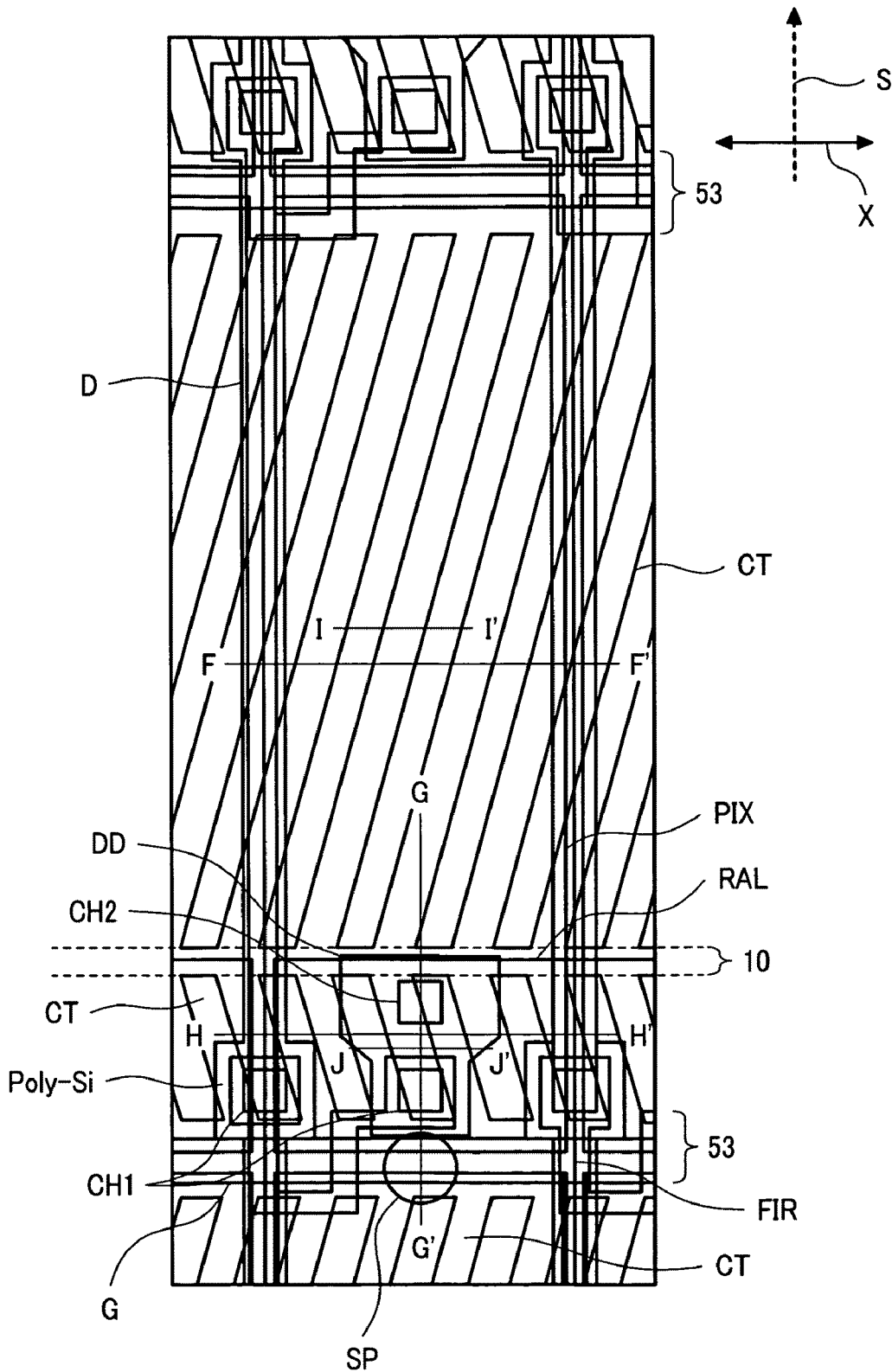
FIG. 12 is a plan view showing an electrode structure of a sub-pixel of a transflective liquid crystal display device as a third embodiment of the invention.
Figure 13:
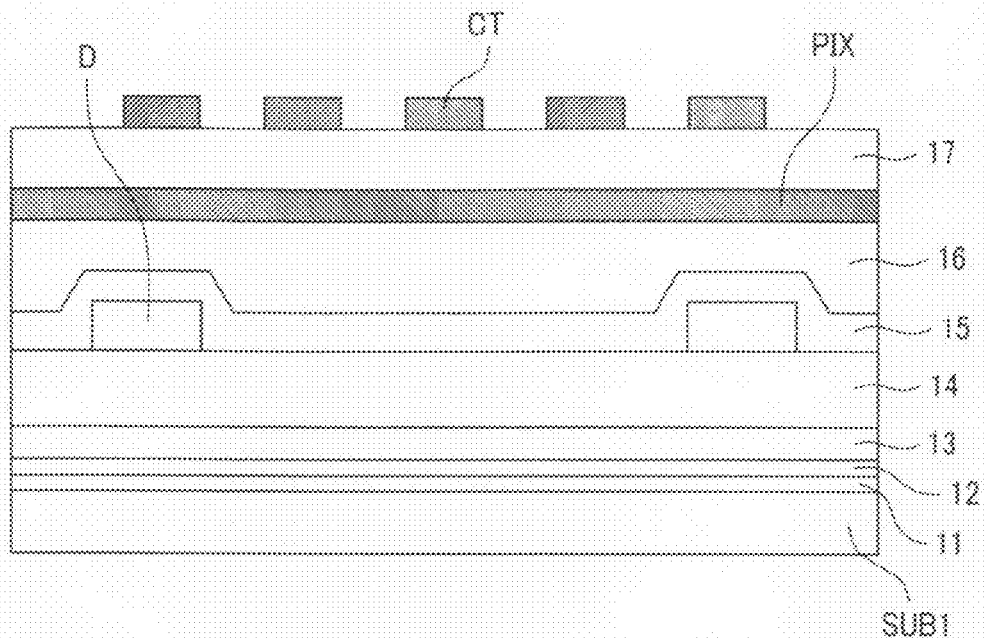
FIG. 13 is a cross sectional view for a main portion showing a cross sectional structure along line F-F' in FIG. 12.
Figure 14:
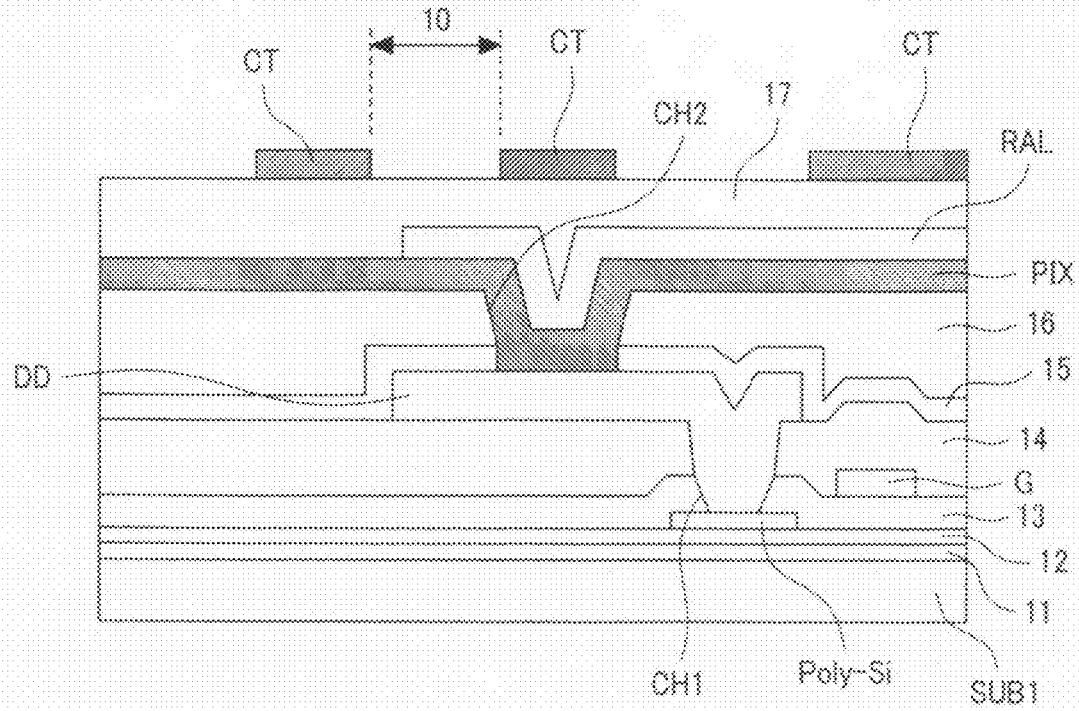
FIG. 14 is a cross sectional view for a main portion showing a cross sectional structure along line G-G' in FIG. 12.
Figure 15:
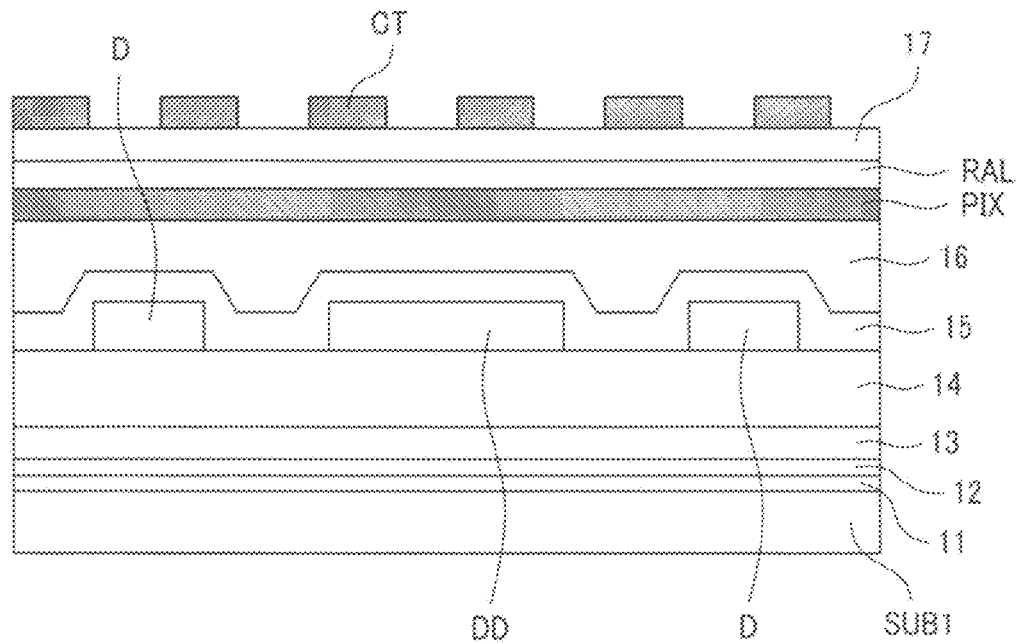
FIG. 15 is a cross sectional view for a main portion showing a cross sectional structure along line H-H' in FIG. 12.
Figure 16:
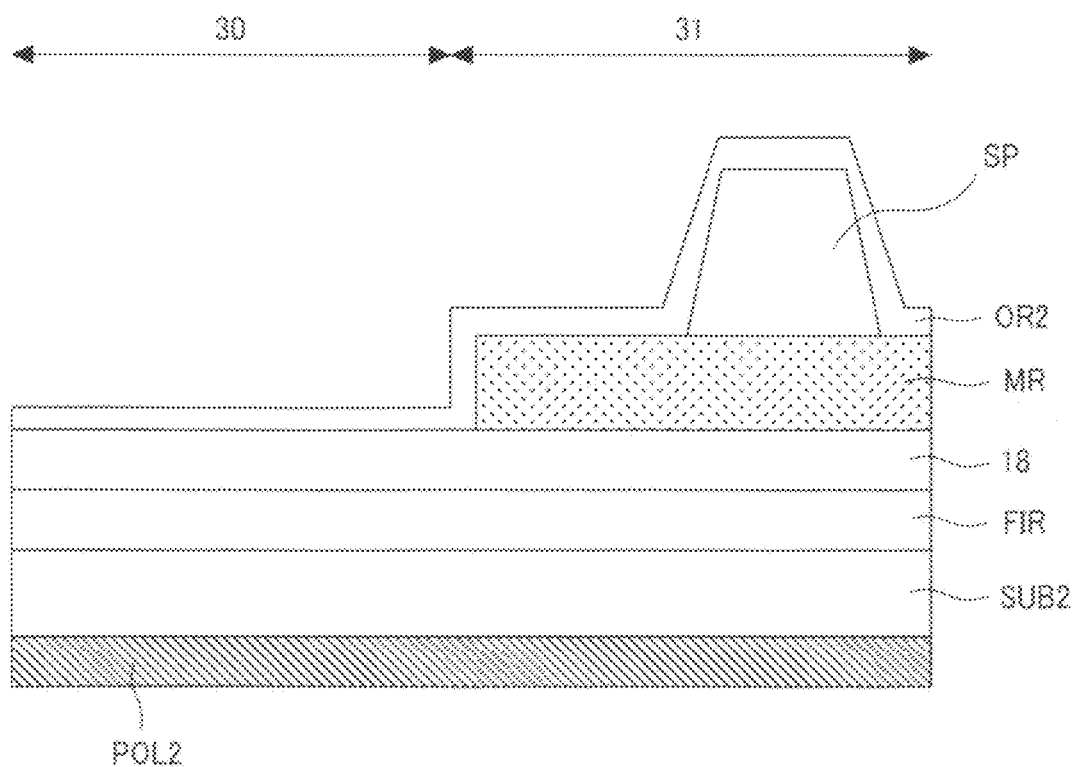
FIG. 16 is a cross sectional view for a main portion showing a cross sectional structure on the side of a substrate provided with a support spacer shown in FIG. 12.
Figure 17:
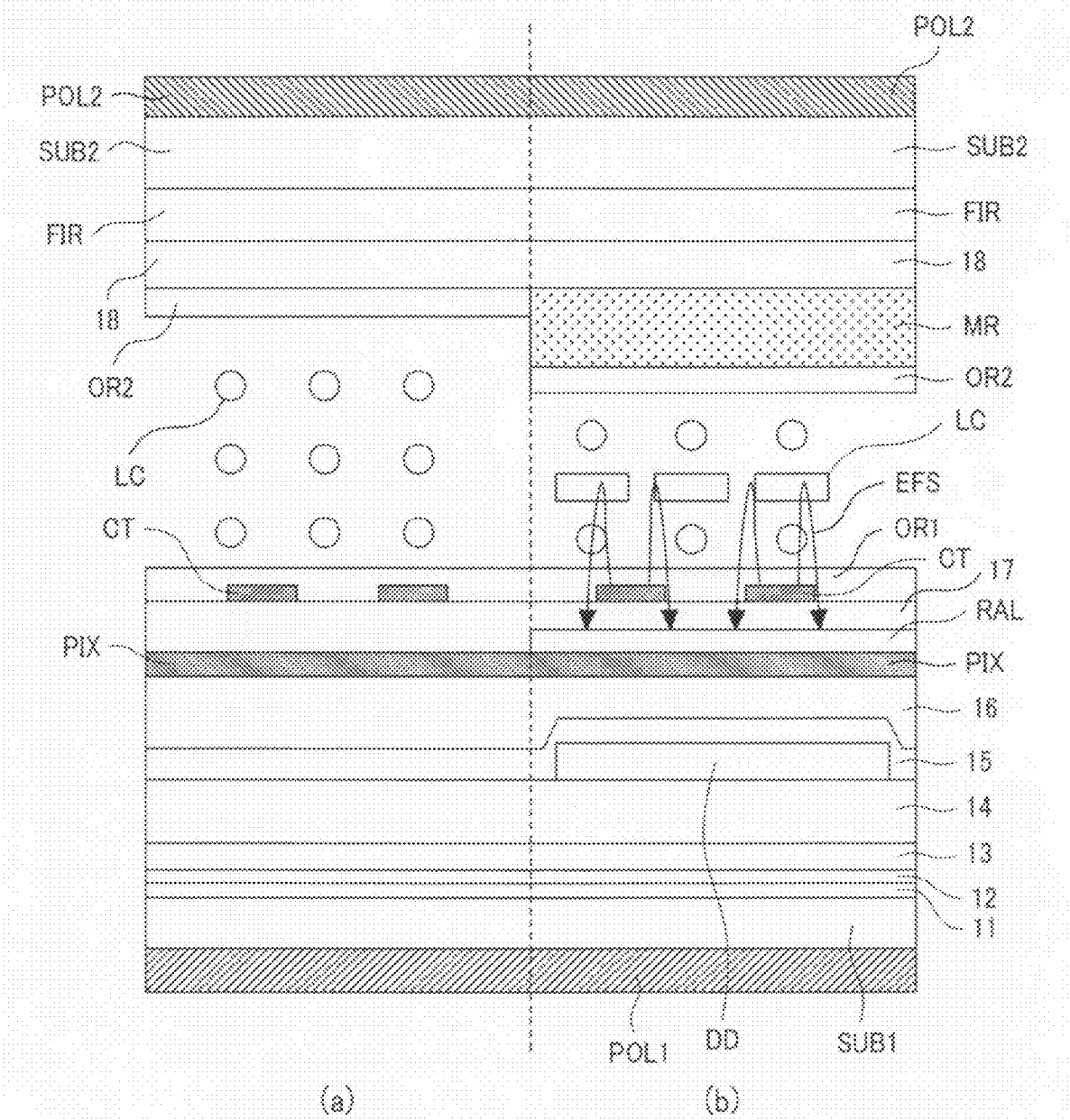
FIG. 17 is a cross sectional view for a main portion showing a cross sectional structure along line I-I' and line J-J' in FIG. 12.

FIG. 12 to FIG. 17 are views for a transflective liquid crystal display device as a third embodiment of the invention in which:

FIG. 12 is a plan view showing an electrode structure of a sub-pixel;

FIG. 13 is a cross. sectional view for a main portion showing a cross sectional structure along line F-F' in FIG. 12;

FIG. 14 is a cross sectional view for a main portion showing a cross sectional structure along line G-G' in FIG. 12;

FIG. 15 is a cross sectional view for a main portion showing a cross sectional structure along line H-H' in FIG. 12;

FIG. 16 is a cross sectional view for a main portion showing a cross sectional structure on the side of a substrate provided with a support spacer shown in FIG. 12; and FIG. 17 is a cross sectional view for a main portion showing a cross sectional structure along line I-I' and line J-J' in FIG. 12.

The transflective liquid crystal display device of the third embodiment basically has the same constitution as that of the first and second embodiments described previously and is different for the following constitutions.

That is, in the first and second embodiments, as shown in FIG. 1A to FIG. 6 and FIG. 10, the interlayer insulative film 17 is formed on the planar counter electrode (CT), and the pixel electrode (PIX) is formed on the interlayer insulative film 17. However, in the third embodiment, as shown in FIG. 12 to FIG. 17, an interlayer insulative film 17 is formed on a planar pixel electrode (PIX), and counter electrodes (CT) are formed on the interlayer insulative film 17. Accordingly, a reflection electrode (RAL) is formed on the pixel electrode (PIX).

Further, in the cross sectional structure, since the pixel electrode (PIX) situates to a layer below the counter electrode (CT), a contact hole CH3 is not formed.

This is different from the first embodiment in view of the production process with respect to the following two points with reference to the production process of the first embodiment.

(1) The order for the step of forming the counter electrode and the step of forming the pixel electrode (PIX) is switched.

(2) Formation of the interlayer insulative film 17 lacks in the fabrication for coating and the succeeding steps.

Further, in the third embodiment, the pixel electrode (PIX) is a planar electrode and the counter electrode (CT) is a comb-shaped electrode having a plurality of linear portions in which the comb-shaped counter electrodes (CT) is arranged obliquely to the clearance 10 between the counter electrode (CT) of the transmission portion 30 and the reflection portion 31, and the liquid crystal initial alignment direction (S).

In the first and second embodiments in which the pixel electrode (PIX) is formed to a layer above the counter electrode (CT), it is also necessary to bend the video line (D) corresponding to the bending of the pixel electrode (PIX) in order to avoid lowering of the ratio of opening and lowering of the color reproducibility. However, this increases the resistance of the video line (D) to cause signal delay. On the contrary, in the third embodiment, bending of the comb-shaped counter electrode (CT) and the video line (D) can be determined optionally. For example, it is possible to bend only the comb-shaped counter electrode (CT) while leaving the video line (D) linear thereby suppressing resistance.

Further, for preventing the light leakage in the transmission portion 30 upon black display, the direction of an electric field generated between the comb-shaped counter electrode (CT) situating at the clearance 10 and the comb-shaped counter electrode (CT) at a position nearest thereto (direction perpendicular to the extending direction of the clearance 10) and the liquid crystal initial alignment direction (S) of the liquid crystal layer (LC) is made substantially in parallel (in a case of positive type liquid crystals).

In a case of negative type liquid crystals, both of them may be substantially perpendicular to each other. "substantially" means a range preferably within ±2°.

Also in the third embodiment constituted as described above, it is possible to improve the display quality of the transflective liquid crystal display device like the first embodiment described above.

Figure 18:
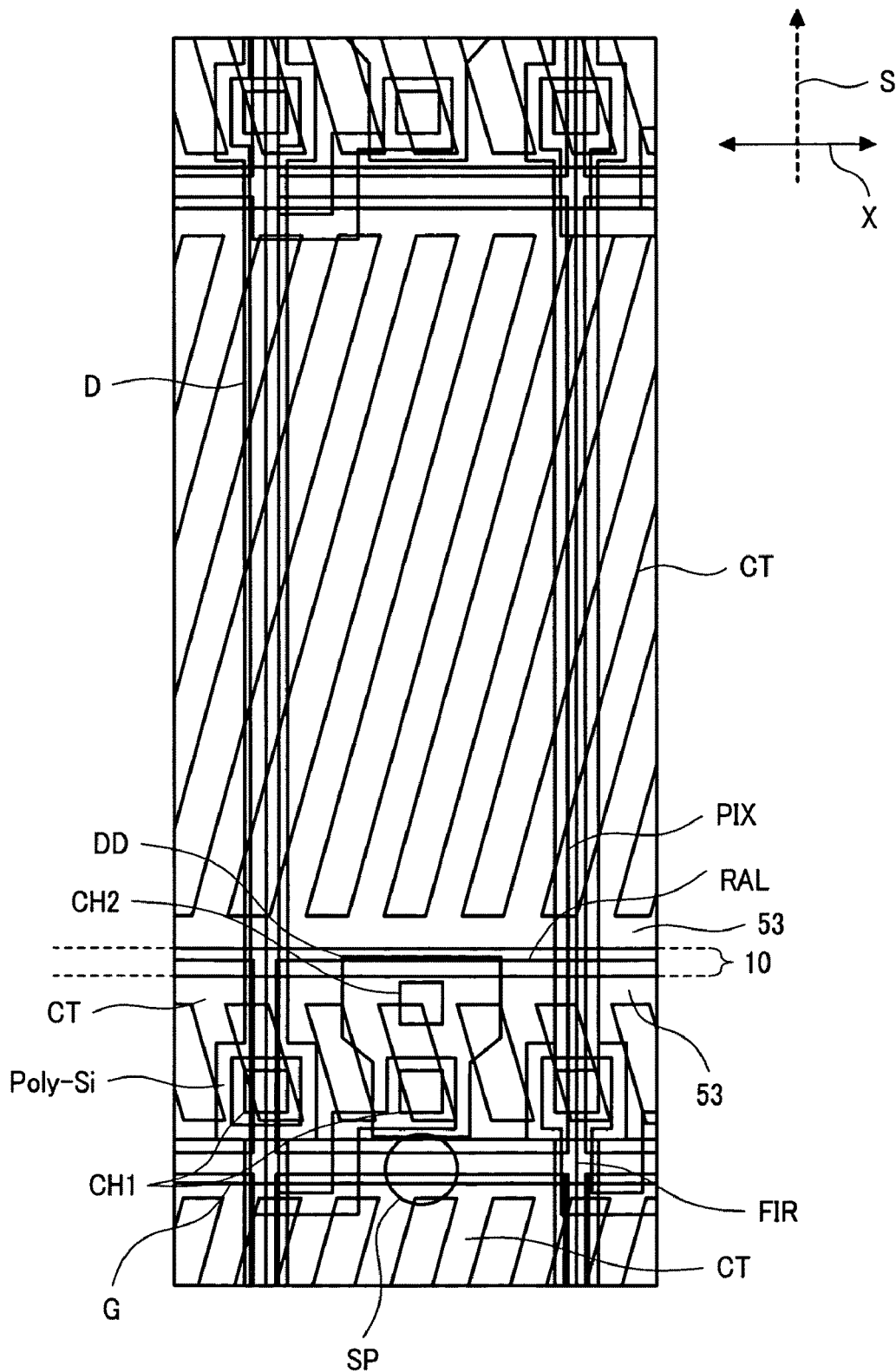
FIG. 18 is a plan view showing an electrode structure of a sub-pixel of a transflective liquid crystal display device as a modified example of a third embodiment of the invention.

FIG. 18 is a plan view showing an electrode structure of a sub-pixel of a transflective liquid crystal display device as a modified example of the third embodiment of the invention.

In the third embodiment described above, a plurality of linear portions of the counter electrode (CT) are independent respectively near the clearance 10. In this modified example, a plurality of linear portions of the counter electrode (CT) have a connection portion 53 on the side of the clearance 10 in the transmission portion 30 and the reflection portion 31.

With such a constitution, the direction of an electric field generated between the counter electrode (CT) of the transmission portion 30 and the counter electrode (CT) of the reflection portion 31 is stabilized.

FOURTH EMBODIMENT

Figure 19:
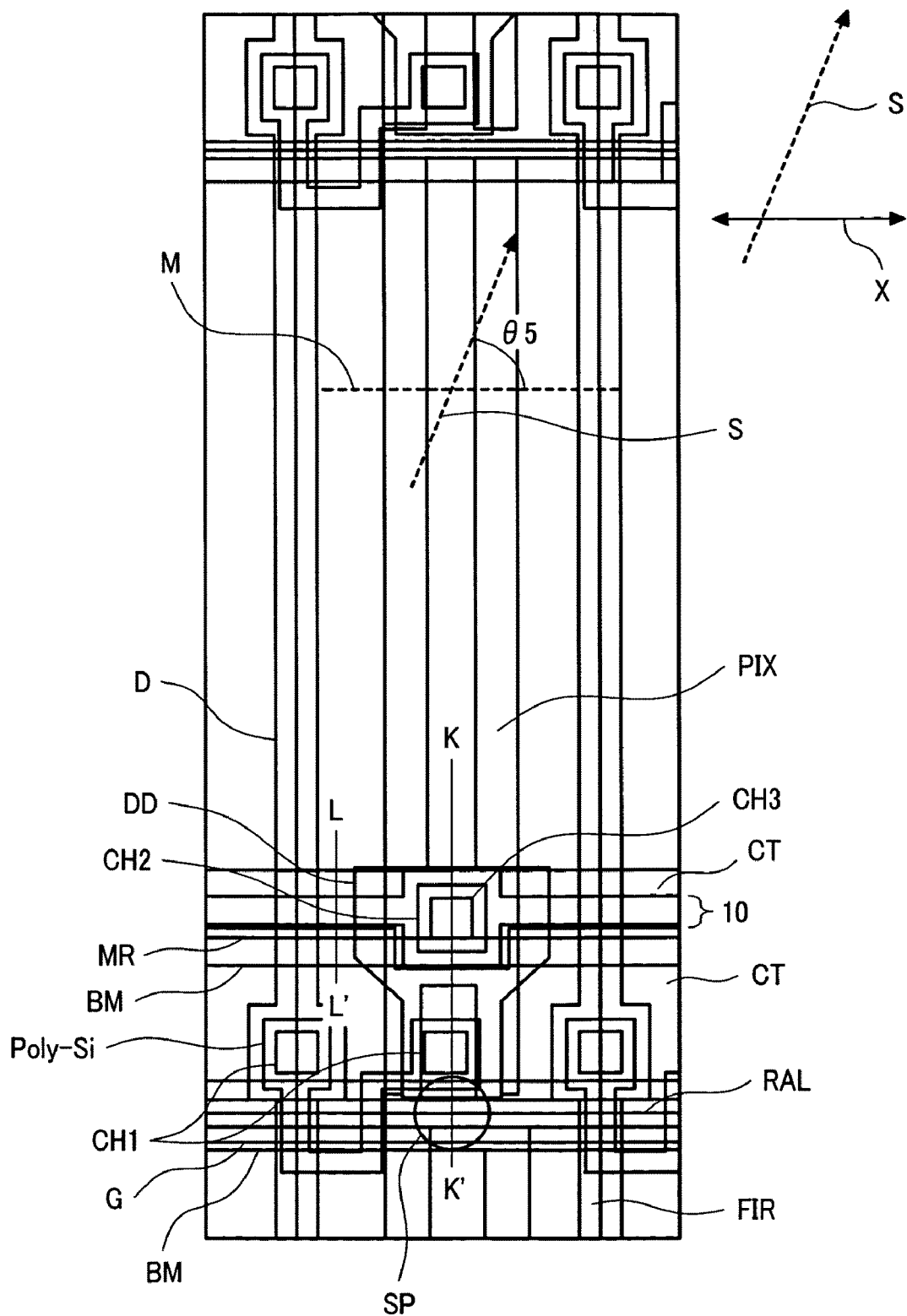
FIG. 19 is a plan view showing an electrode structure of a sub-pixel of a transflective liquid crystal display device as a fourth embodiment of the invention.

FIG. 19 is a plan view showing an electrode structure of a sub-pixel of a transflective liquid crystal display device as a fourth embodiment of the invention and FIG. 20 is a cross sectional view for a main portion showing a cross sectional structure along line K-K' in FIG. 19.

For the first to third embodiments described above, description has been made to examples of suppressing light leakage by considering the liquid crystal initial alignment direction (S) of the liquid crystal layer (LC). In the fourth embodiment, description is to be made to an example of suppressing the light leakage by using a light shielding film.

In the fourth embodiment, as shown in FIG. 20, a light shielding film (BM) is disposed so as to cover a clearance 10 between the counter electrode (CT) of the transmission portion 30 and the counter electrode (CT) of the reflection portion 31, thereby shielding the light leakage of the transmission portion 30 generated upon black display. The light shielding film (BM) is arranged so as to cover at least the central portion along the extending direction (X) of the clearance 10.

In FIG. 19, an angle θ5 formed between the liquid crystal initial alignment direction (S) of the liquid crystal (LC) and the direction (M) perpendicular to the extending direction (N) of the comb-shaped pixel electrode (PIX) is set to 75°.

Figure 21A:
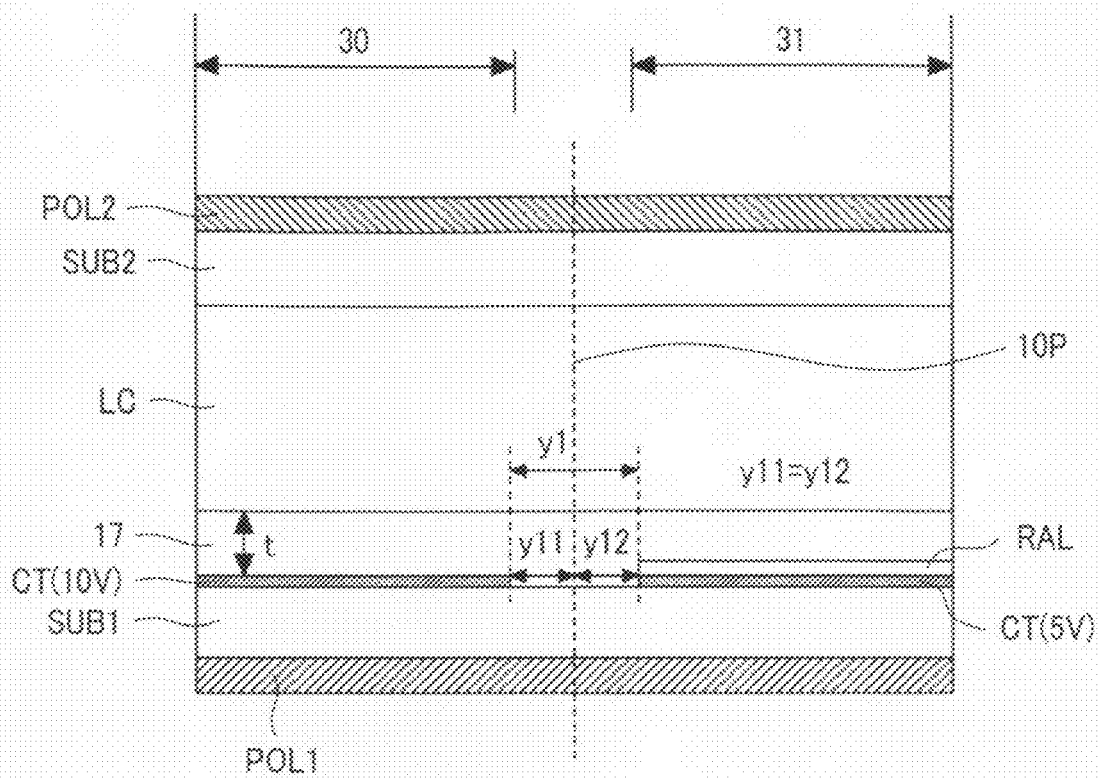
FIG. 21A is a calculation model view.
Figure 21B:
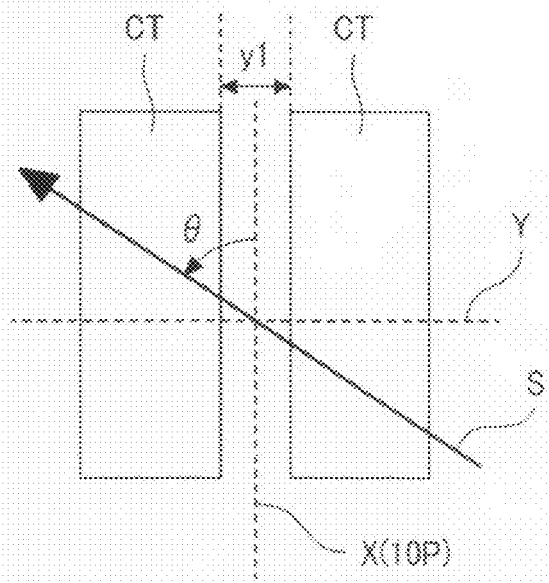
FIG. 21B is a view showing the definition for the liquid crystal initial aligning direction.
Figure 21C:
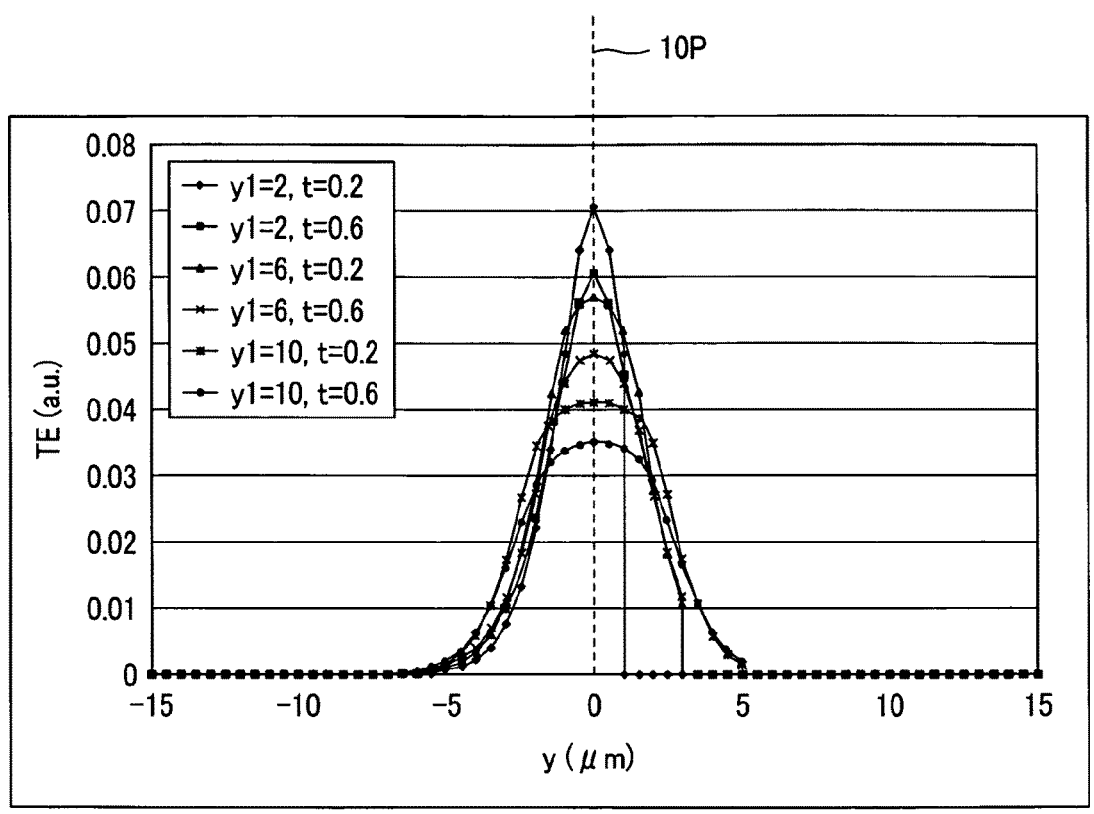
FIG. 21C is a graph showing the result of calculation for light leaking in a transmission portion upon black display generated by an electric field of a clearance along line L-L' in FIG. 19.

FIG. 21C shows the result of calculation for the light leakage in the transmission portion upon black display generated by the electric field for the gap along the line L-L' in FIG. 19. FIG. 21A shows a calculation model used for the calculation. Further, FIG. 21B shows an angle θ formed between the liquid crystal initial alignment direction (S) and the direction (M) perpendicular to the extending direction (N) of the pixel electrode (PIX). Further, conditions used for the calculation are shown in Table 3.

However, for the sake of a simulator, different from FIG. 21A, it was calculated assuming that the reflection electrode (RAL) was eliminated and, instead, a light shielding film (BM) is present at a position corresponding to the reflection electrode (RAL) on the side of the glass substrate (SUB2).

In FIG. 21A, the voltage on the counter electrode (CT) of the transmission portion 30 is 10 V and that on the counter electrode (CT) of the reflection portion 31 is 5 V. In FIG. 21C, the abscissa shows a coordinate as the center 10P for y1 as: y=0.

TABLE 3

| Item | Details | Symbol | | Unit | Remark |
|---|---|---|---|---|---|
| Optical film | Absorption axis of upper polarization plate | — | 165 | deg | Perpendicular to the initial alignment axis |
| | Absorption axis of lower polarization plate | — | 75 | deg | Aligned with initial alignment axis |
| Electrode | Width of comb-shaped electrode | y1 | 2, 6, 10 | μm | Parameter |
| Interlayer insulative film | Dierectric constant | ε | 3.3 | — | |
| | Film thickness | t | 0.2, 0.6 | μm | Parameter |
| Liquid crystal | Anisotropy dielectric constant | Δε | 7 | — | |

TABLE 3-continued

| Item | Details | Symbol | | Unit | Remark |
|---|---|---|---|---|---|
| | Anisotropy diffractive index | Δn | 0.08 | — | |
| | Cell gap | d | 4 | μm | |
| | Initial alignment axis angle | θ | 75 | deg | |

As shown in FIG. 21C, the transmission efficiency (TE) (showing the intensity of leakage light in the transmission portion) changes depending on the width y1 of the clearance 10 and the thickness t of the interlayer insulative film 17. However, the peak always situates at the center 10P for the clearance 10. In view of the foregoings, as a countermeasure for the light leakage in the transmission portion 30 upon black display, the light shielding film (BM) is disposed at least for the center 10P along the extending direction (X) of the clearance 10.

It has been known that the intensity of the light leakage has a peak at the center 10P for the clearance 10 also in a case where θ5 is not 75° (excluding: θ5=90°), and the light shielding film (BM) is also disposed at least for the center 10P of the clearance 10. In the fourth embodiment, the light shielding film (BM) was disposed while defining the width thereof as 8 μm relative to the width y1 of 4 μm for the clearance 10 and aligning the center 10P of the clearance 10 and the center of the light shielding film (BM).

Also in the fourth embodiment constituted as described above, it is possible to improve the display quality of the transflective liquid crystal display device.

While the invention made by the present inventors has been described specifically with reference to preferred embodiments described above, it will be apparent that the invention is not restricted to the embodiments but can be modified variously within a scope not departing the gist thereof.

What is claimed is:

1. A transflective liquid crystal display device including a liquid crystal display panel having a pair of substrates and a liquid crystal layer put between the pair of substrates, in which the liquid crystal display panel has a plurality of sub-pixels each having a transmission portion and a reflection portion, and each of the plurality of sub-pixels has a pixel electrode and a counter electrode, wherein:
   an active element formed below the reflection portion and a video signal line extending while bending in each of the sub-pixels overriding the transmission portion and the reflection portion are provided; and
   for adjacent two display lines defined as one display line and the other display line, the bending direction and the bending angle of the video signal line in the reflection portion of one display line is identical with the bending direction and the bending angle of the video signal line in the reflection portion of the other display line.

2. A transflective liquid crystal display device according to claim 1, wherein:
   in each of the sub-pixels, the pixel electrode is in common with the transmission portion and the reflection portion, and the counter electrode is independent between the transmission portion and the reflection portion respectively;
   the potential applied to the counter electrode is different between the transmission portion and the reflection portion;
   the counter electrode and the pixel electrode are formed on one of the pair of the substrates;

the transmission portion has a normally black characteristic providing black display in a state of not applying voltage; and the reflection portion has a normally white characteristic providing white display in a state of not applying voltage.

3. A transflective liquid crystal display device including a liquid crystal display panel having a pair of substrates and a liquid crystal layer put between the pair of substrates, in which the liquid crystal display panel has a plurality of sub-pixels each having a transmission portion and a reflection portion, and each of the plurality of sub-pixels has a pixel electrode and a counter electrode, wherein:

in each of the sub pixels, the pixel electrode is in common with the transmission portion and the reflection portion, and the counter electrodes is independent respectively between the transmission portion and the reflection portion; and at least a central portion along the extending direction of the clearance between the counter electrode of the transmission portion and the counter electrode of the reflection portion is shielded by a light shielding film.

4. A transflective liquid crystal display device according to claim 3, wherein:

the potential applied to the counter electrodes is different between the transmission portion and the reflection portion;

the counter electrode and the pixel electrode are formed on one of the pair of substrates;

the transmission portion has a normally black characteristic providing black display in a state of not applying a voltage; and the reflection portion has a normally white characteristic providing white display in a state of not applying a voltage.

* * * * *